United States Patent
Ota et al.

(10) Patent No.: US 6,697,222 B2
(45) Date of Patent: Feb. 24, 2004

(54) TAPE CASSETTE WITH WIDE EXTRACTION PORTIONS AND TAPE DRIVE APPARATUS

(75) Inventors: Shuichi Ota, Saitama (JP); Sunao Kushiro, Chiba (JP)

(73) Assignee: Sony Corporation (JP)

( * ) Notice: Subject to any disclaimer, the term of this patent is extended or adjusted under 35 U.S.C. 154(b) by 224 days.

(21) Appl. No.: 09/852,272

(22) Filed: May 10, 2001

(65) Prior Publication Data

US 2002/0003680 A1 Jan. 10, 2002

(30) Foreign Application Priority Data

May 18, 2000 (JP) ..................... P2000-146857

(51) Int. Cl.[7] .......................................... G11B 23/087
(52) U.S. Cl. ...................................... 360/132; 242/347
(58) Field of Search .................... 360/132, 95; 242/347

(56) References Cited

U.S. PATENT DOCUMENTS 4,712,149 A * 12/1987 Goto et al. ................. 360/132
5,316,234 A * 5/1994 Honsho et al. ............. 360/132
6,437,941 B1 * 8/2002 Ota et al. ................... 360/132
2002/0003679 A1 * 1/2002 Ota ............................ 360/132

* cited by examiner

Primary Examiner—Craig A. Renner
(74) Attorney, Agent, or Firm—Rader, Fishman & Grauer PLLC; Ronald P. Kananen

(57) ABSTRACT

Disclosed is a tape cassette including a cassette shell in which tape reels around which a tape-like recording medium is wound are contained; a mouth portion provided in a front portion of the cassette shell in such a manner as to be opened forwardly, upwardly, and downwardly, the mouth portion being positioned such that part of the tape-like recording medium crosses the front end of the mouth portion; and a front lid, provided on the cassette shell, for covering the front side of the tape-like recording medium; wherein both side portions of the mouth portion of the cassette shell are taken as tape extraction portions opened forwardly; and each of the inner surfaces of outer side surface front portions of the cassette shell, which forms each of the inner surfaces of outer side walls of the tape extraction portions, is formed into a taper surface which becomes wider outwardly as nearing the front end. With this configuration, it is possible to increase the degree of freedom in design of tape extraction guides of a tape drive apparatus, and to loosen the arrangement accuracy of the tape extraction guides.

3 Claims, 28 Drawing Sheets

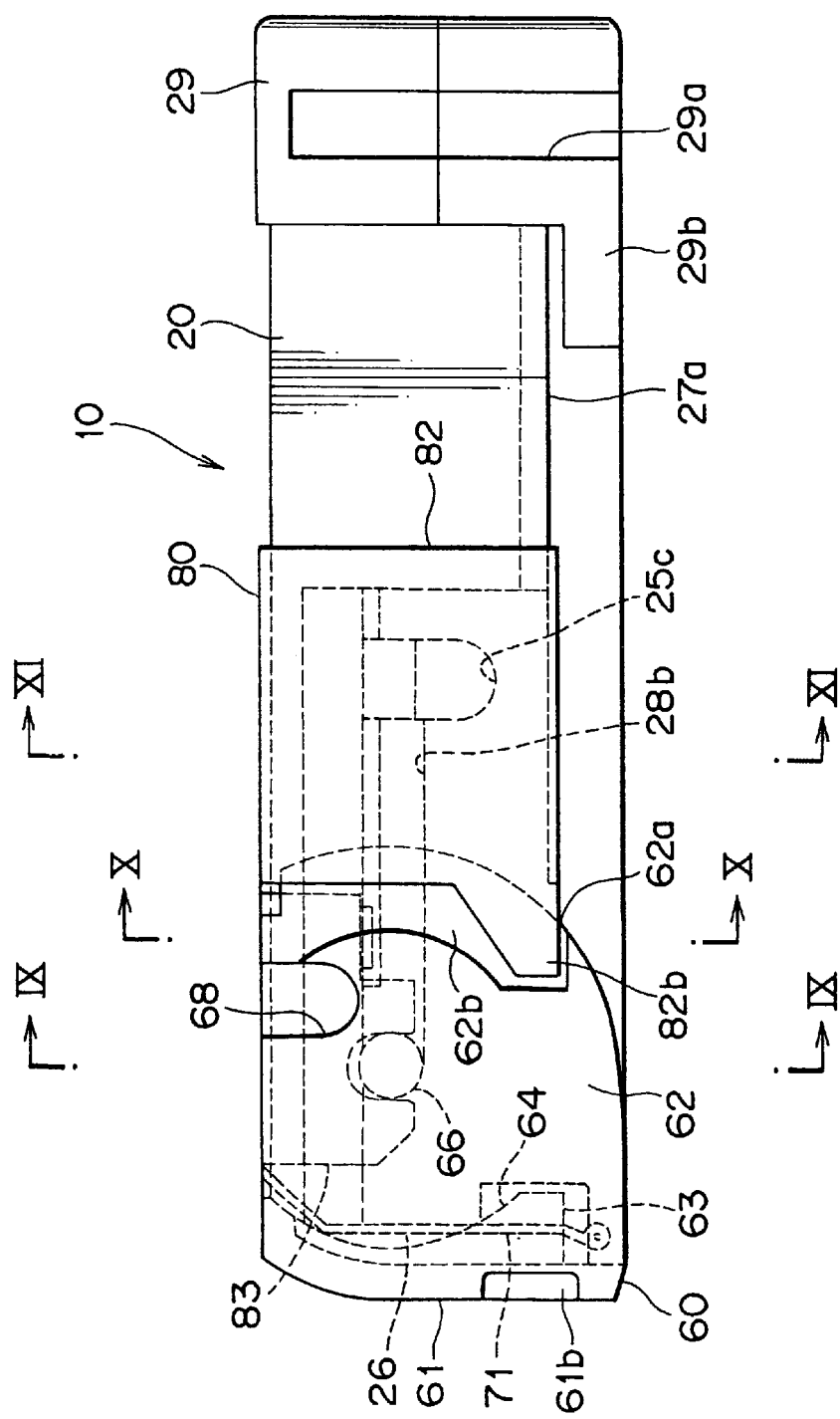

TAPE CASSETTE WITH WIDE EXTRACTION PORTIONS AND TAPE DRIVE APPARATUS

BACKGROUND OF THE INVENTION

The present invention relates to a new tape cassette, and particularly to a technique of enlarging openings of extraction portions, provided in a tape cassette, for extracting a tape-like recording medium.

In tape drive apparatuses of a type in which recording/reproducing is performed by using a rotary head drum, a tape-like recording medium is extracted forwardly from a tape cassette and is wound around the rotary head drum. Accordingly, the arrangement of tape extraction guides provided on the tape drive apparatus side is limited to the sizes of openings of tape extraction portions of the tape cassette.

FIG. 28 is a schematic plan view showing a state in which a related art tape cassette "a" is mounted in a tape drive apparatus and the tape is loaded therein.

In the tape cassette "a", a supply side reel "c" and a winding side reel "d" around which a magnetic tape "b" is wound are rotatably contained in a cassette shell "e".

A large recess "f", called a "mouth portion", is formed in a front portion of the cassette shell "e" in such a manner as to be opened forwardly, upwardly, and downwardly.

Both side portions of the mouth portion "f" of the cassette shell "e", which are opened forwardly, are taken as tape extraction portions "g" each of which is formed into a lying hollowed square cylinder.

In the non-loading state of the tape cassette "a" in the tape drive apparatus, the magnetic tape "b" is extracted outwardly from the openings at the front surfaces of the tape extraction portions "g" and is stretched between the tape extraction portions "g" in such a manner as to cross the front surface of the mouth portion "f".

When a tape loading command is given to the tape drive apparatus, the tape loading is performed by extracting the magnetic tape "b" outwardly by tape guides "h", tape extraction guides "i", and pinch rollers "j" and simultaneously moving a rotary head drum "k" in such a manner as to enter the mouth portion "f" (see FIG. 28).

The above-described related art tape cassette "a", however, has a problem that since the openings of the tape extraction portions "g" of the cassette shell "e" are relatively narrow, the arrangement of the tape extraction guides "i" is strictly limited thereto, with a result that the positional accuracy of the tape extraction guides "i" must be increased. In particular, such a problem becomes significant along with miniaturization of the tape cassette "a".

To be more specific, a triangular region "t" (shown by a pear-skin pattern in the figure), which is formed between an extension line connecting an extracted portion of the magnetic tape "b" wound around the tape reel "c" or "d" at maximum to an outer opening edge of the tape extraction portion "g" and an extension line connecting an extracted portion of the magnetic tape "b" wound around the tape reel "c" or "d" at minimum to an outer opening edge of the tape extraction portion "g", is defined as a "possible arrangement region" in which each of the tape guides "i" can be arranged. In the related art tape cassette "a", since such possible arrangement regions "t" are narrow, the degree of freedom in design of the arrangement of the tape extraction guides "i" is small.

Further, since the possible arrangement regions "t" are narrow, there arises a problem that the positional accuracy of the tape extraction guides "i" provided in the tape drive apparatus must be increased.

SUMMARY OF THE INVENTION

An object of the present invention is to provide a tape cassette, which is capable of enlarging possible arrangement regions of tape extraction guides of a tape drive apparatus by increasing lateral widths of tape extraction portions of a cassette shell, thereby increasing the degree of freedom in design of the tape extraction guides and loosening the arrangement accuracy of the tape extraction guides.

To achieve the above object, according to an aspect of the present invention, there is provided a tape cassette including: a cassette shell in which tape reels around which a tape-like recording medium is wound are contained; a mouth portion provided in a front portion of said cassette shell in such a manner as to be opened forwardly, upwardly, and downwardly, said mouth portion being positioned such that part of said tape-like recording medium crosses the front end of said mouth portion; and a front lid, provided on said cassette shell, for covering the front side of said tape-like recording medium; wherein both side portions of said mouth portion of said cassette shell are taken as tape extraction portions opened forwardly; and each of the inner surfaces of outer side surface front portions of said cassette shell, which forms each of the inner surfaces of outer side walls of said tape extraction portions, is formed into a taper surface which becomes wider outwardly as nearing the front end.

With this configuration, since the lateral widths of the openings of the tape extraction portions of the tape cassette can be increased, the possible arrangement regions of the tape extraction guides can be enlarged. As a result, it is possible to increase the degree of freedom in design of the tape extraction guides and to loosen the arrangement accuracy of the tape extraction guides.

Further, since the arrangement positions of the tape extraction guides can be disposed outwardly more than those of tape extraction portions provided in the related art tape drive apparatus, it is possible to make the ratio of the size of a rotary head drum to the size of the tape cassette larger than that adopted in the related art tape drive apparatus and to miniaturize the tape cassette.

BRIEF DESCRIPTION OF THE DRAWINGS

FIG. 8 is a right side view of the tape cassette;

FIGS. 9A and 9B are enlarged sectional views taken on line IX—IX of FIG. 8, wherein FIG. 9A shows a left end portion of the tape cassette, and FIG. 9B shows a right end portion of the tape cassette;

FIGS. 10A and 10B are enlarged sectional views taken on line X—X of FIG. 8, wherein FIG. 10A shows a left end portion of the tape cassette, and FIG. 10B shows a right end portion of the tape cassette;

FIGS. 11A and 11B are enlarged sectional views taken on line XI—XI of FIG. 8, wherein FIG. 11A shows a left end portion of the tape cassette, and FIG. 11B shows a right end portion of the tape cassette;

FIGS. 20A and 20B are enlarged sectional views taken on line XX—XX of FIG. 19, wherein FIG. 20A shows a left end portion of the tape cassette, and FIG. 20B shows a right end portion of the tape cassette;

With reference to FIG. 29, a First point represents a tip of the inner side surface front portion of the tape extraction portion. A Second point is an extracted portion of the tape-like recording medium wound around the tape reels at a minimum. A Third point is an extracted portion of the tape-like recording medium wound around the tape reel at the maximum. A Fourth point is a tip of the taper portion formed on the outer side surface front portion of the tape extraction portion. A Fifth point is an inner corner at the tip of extraction portion with a thickness of the outer wall assumed to be constant.

Possible arrangement regions T and t are defined by using these points. Boundaries of the possible arrangement region T are two lines. One line is the line connecting the First point and the Second point This line is the inner side boundary of the region T. Another line is the line connecting the Third and the Fourth points. This line is the outer side boundary of the region T.

One more line is defined which connects the Third point and the Fifth point. This line is the outer side boundary of the possible arrangement region t illustrated by the related art.

Figure 29:
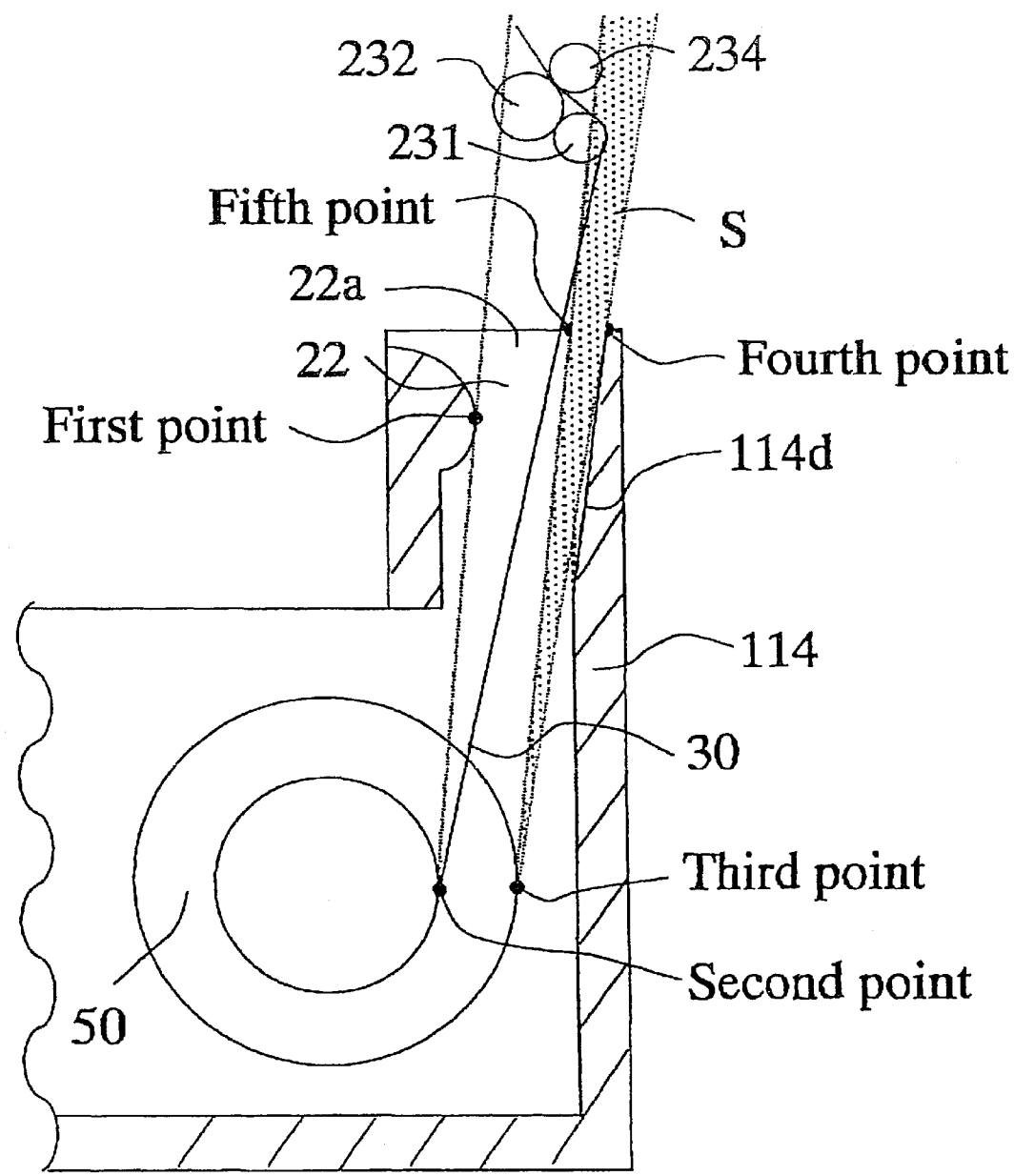
FIG. 29 is an enlarged view around an extraction portion in FIG. 27.

The region S is defined as the region between two lines. One is an extension line connecting the Third point to the Fourth point and another is an extension line connecting the Third point to the Fifth point. The region S is the expanded region in which tape extraction pins are disposed by using the cassette tape of the present invention By the related art, the pins could not be disposed in this region S (see FIG. 29).

Therefore, by the present invention, the tape extraction pins and the extraction guides 231, can be disposed to overlap with the region S.

DETAILED DESCRIPTION OF THE PREFERRED EMBODIMENT

Hereinafter, an embodiment of a tape cassette of the present invention will be described with reference to the accompanying drawings.

Figure 1:
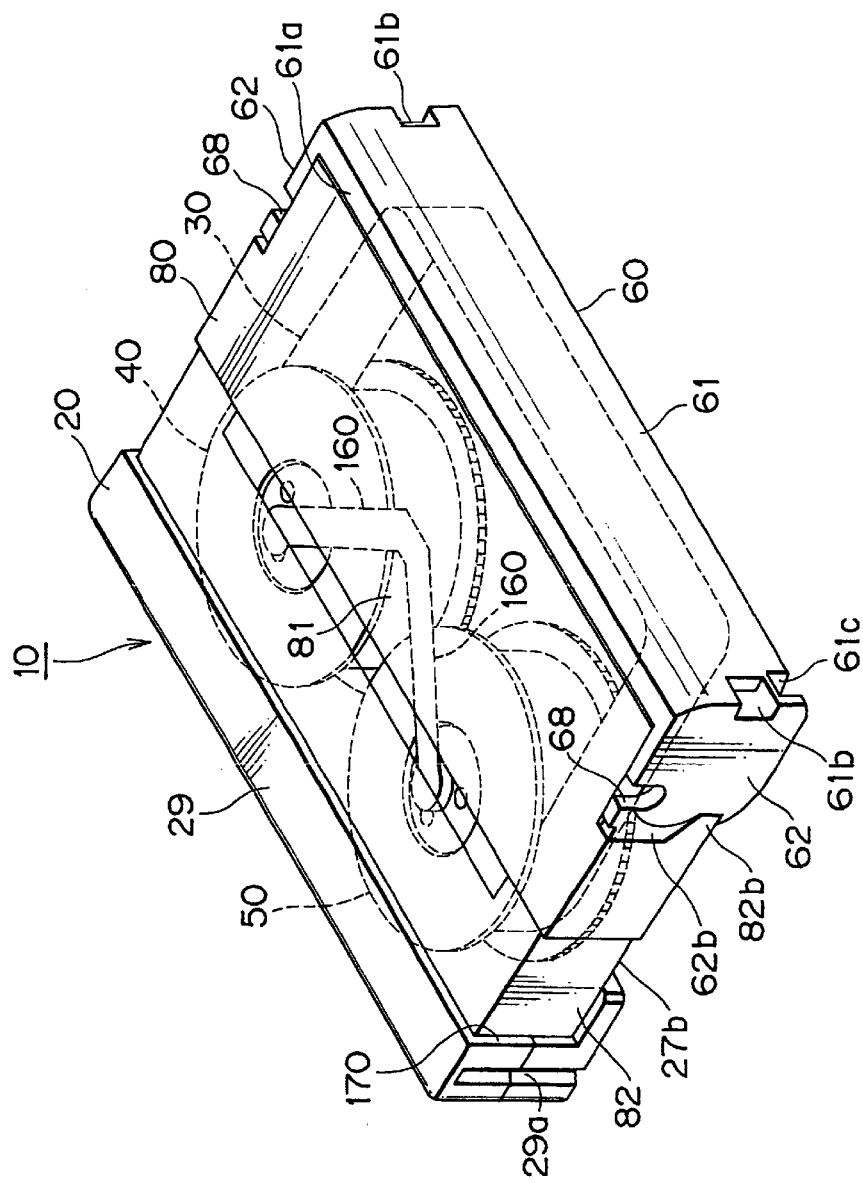
FIG. 1 is a perspective view showing a front lid, located at a lid closed position, of a tape cassette according to an embodiment of the present invention.
Figure 2:
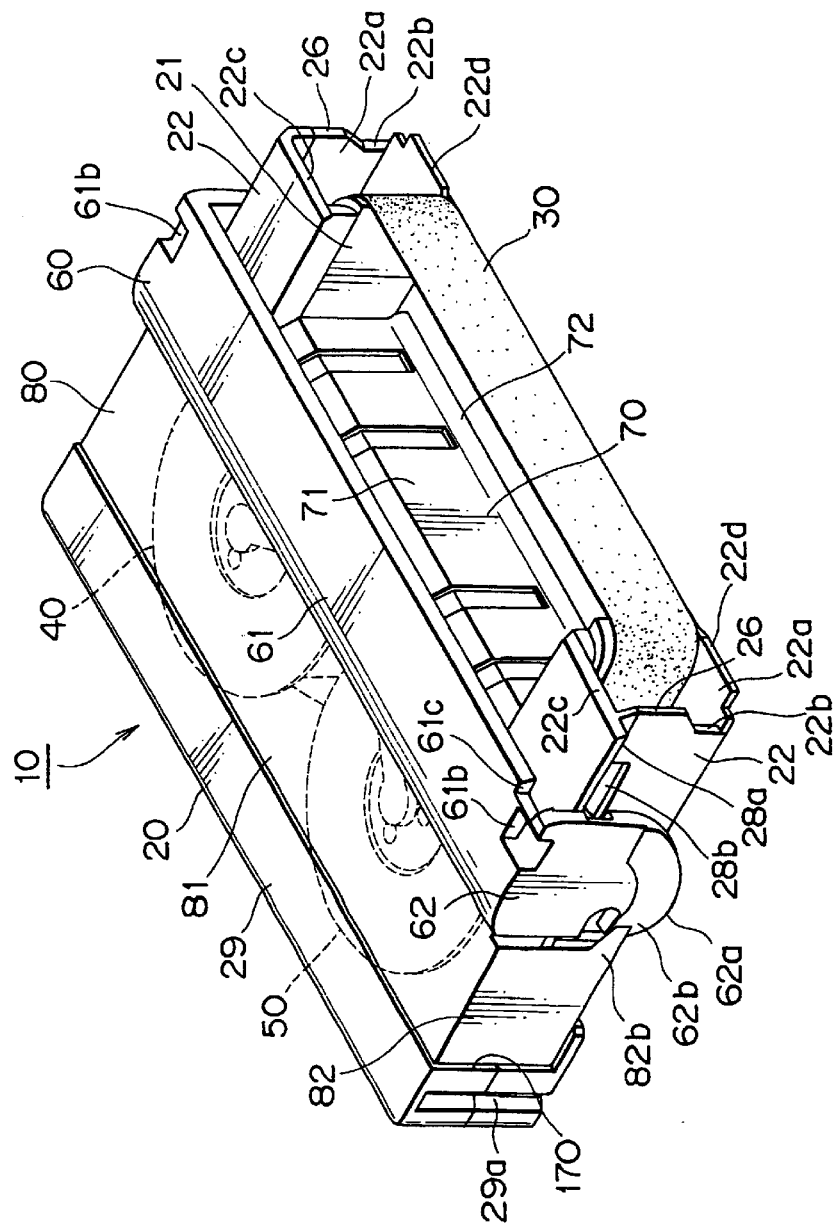
FIG. 2 is a perspective view showing the front lid and a back lid, located at lid opened positions, of the tape cassette.
Figure 7:
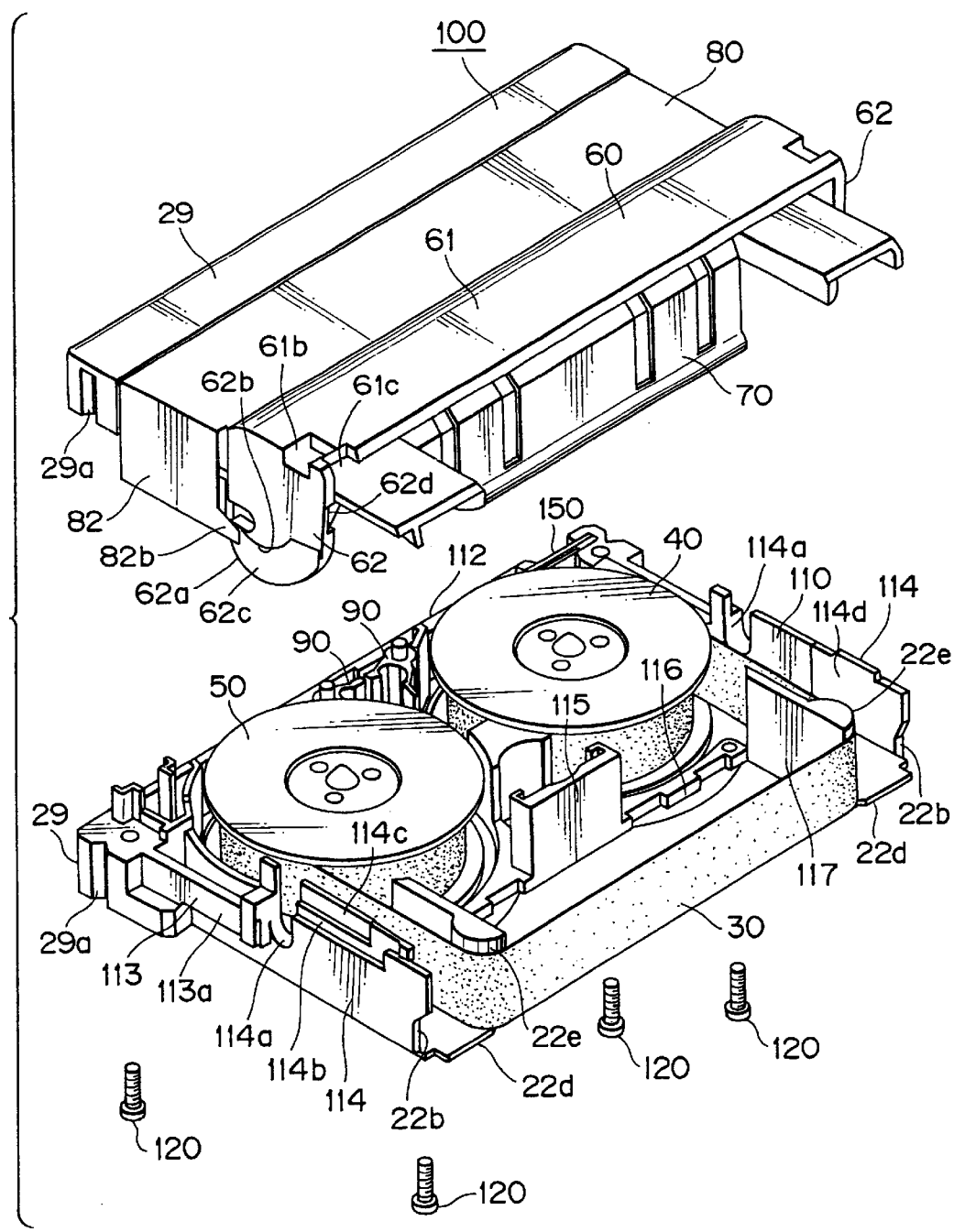
FIG. 7 is a perspective view showing the upper shell unit in which the slider unit has been assembled and the lower shell unit, located separately from each other, of the tape cassette.

Referring to FIGS. 1, 2 and 7, a tape cassette 10 includes a thin-box shaped cassette shell 20 in which tape reels 40 and 50 around which a magnetic tape 30 representative of a tape-like recording medium are rotatably contained, a front lid 60 for covering the front surface side of the magnetic tape 30 positioned along the front surface of the cassette shell 20, and a back lid 70 for covering the back side of the magnetic tape 30. The back lid 70 is integrally formed on a slider 80 supported on the cassette shell 20 in such a manner as to be movable in the longitudinal direction, and the front lid 60 is turnably supported at a front end portion of the slider 80.

The thin-box shaped cassette shell 20 is made from a plastic material so that the whole of the cassette shell 20, or part of the cassette shell 20, from which the tape reels 40 and 50 are entirely or partly viewed from above, is made transparent (see FIG. 7).

As shown in FIG. 2, a large recess 21, called a mouth portion, is formed in a front portion of the cassette shell 20. The mouth portion 21 is opened forwardly, upwardly, and downwardly.

Figure 3:
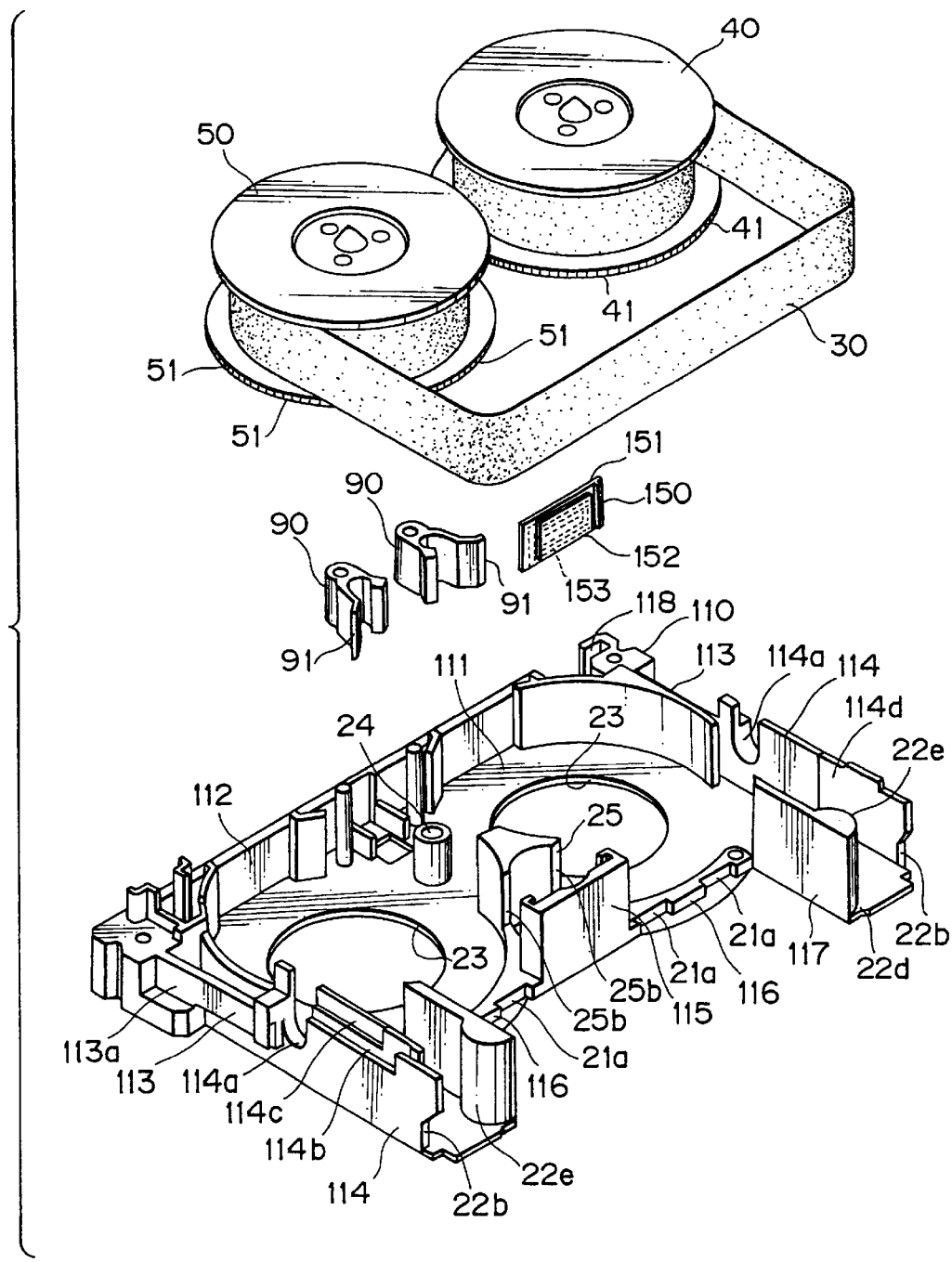
FIG. 3 is an exploded perspective view showing a lower shell unit of the tape cassette.
Figure 4:
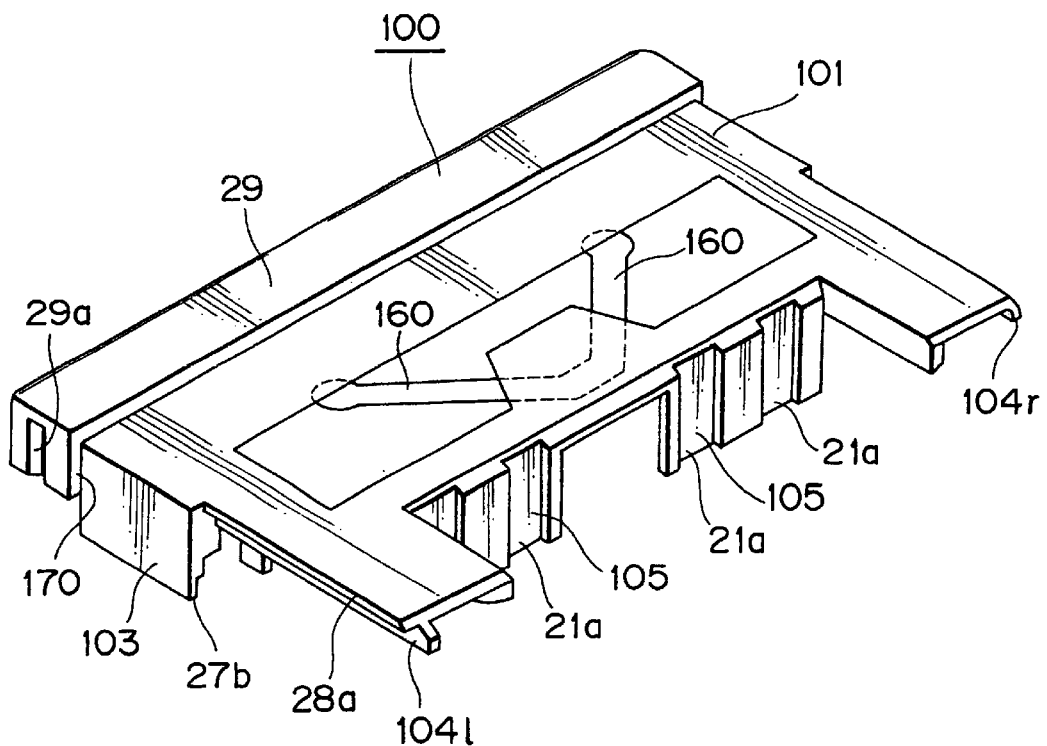
FIG. 4 is a perspective view showing an upper shell unit of the tape cassette.

The depth surface of the mouth portion 21 has, at an area excluding portions facing to the maximum outside diameter portions of the tape reels 40 and 50 disposed in the cassette shell 20, a plurality of stripe-like recesses 21a extending in the vertical direction (see FIGS. 3 and 4).

As shown in FIG. 2, a tape extraction portion 22 formed into a lying hollowed square cylinder is provided on each of both sides of the mouth portion 21 of the cassette shell 20.

A front end 22a of the tape extraction portion 22 is opened. The magnetic tape 30 is extracted outside from the openings 22a of the tape extraction portions 22, and is stretched between the openings 22a while crossing the front surface of the mouth portion 21.

Referring to FIG. 3, a pair of right and left reel base insertion holes 23 are formed in a bottom wall of the cassette shell 20. Engagement holes (not shown) of the tape reels 40 and 50 are opened downwardly through the reel base insertion holes 23. When the tape cassette 10 is mounted in a tape drive apparatus (not shown), reel bases provided on the tape drive apparatus are inserted in the cassette shell 20 through the reel base insertion holes 23 and reel engagement shafts provided on the reel bases are engaged in the engagement holes of the tape reels 40 and 50, and at the same time, the tape reels 40 and 50 are mounted on the reel bases.

Two reel lock members 90 are disposed on an inner rear portion of the cassette shell 20. In the non-loading state of the tape cassette 10, claws 91 of the reel lock members 90 are engaged with a plurality of engagement projections 41 and a plurality of engagement projections 51 formed on lower flanges of the tape reels 40 and 50, respectively, in order to prevent the rotation of the tape reels 40 and 50. The reel lock members 90 are biased in the direction of locking the tape reels 40 and 50 by springs (not shown). When the tape cassette 10 is mounted in a tape drive apparatus (not shown), a lock releasing pin provided on the tape drive apparatus is inserted in an insertion hole 24 formed in the bottom surface of the cassette shell 20, to turn the reel lock members 90 in the lock releasing direction, whereby the locking of the tape reels 40 and 50 by the reel lock members 90 are released.

Figure 23:
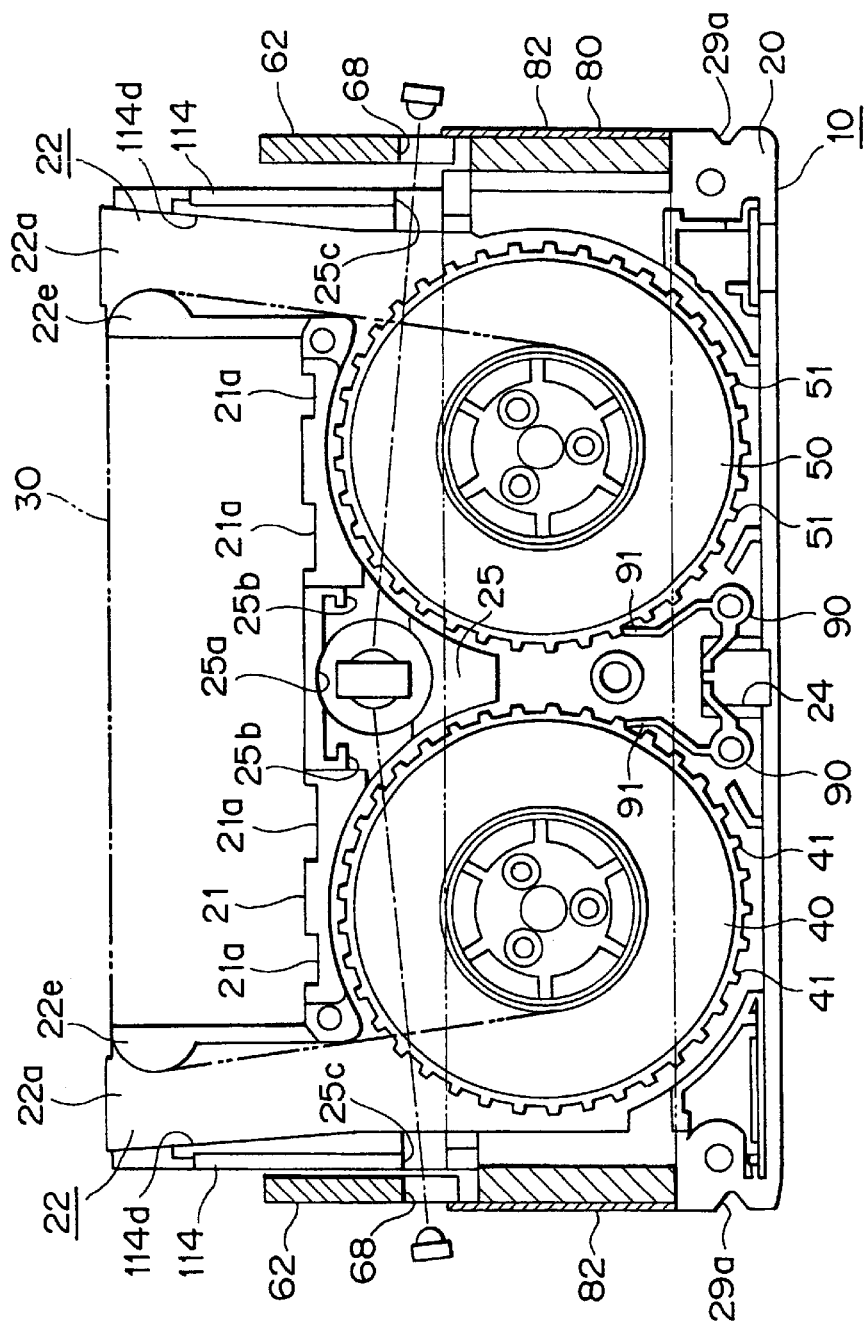
FIG. 23 is a schematic horizontal sectional view showing the state in which the tape cassette is mounted at the specific mounting position of the tape drive apparatus.

As shown in FIG. 23, a shading cylinder 25 is formed inside a central portion in the lateral direction of the depth surface of the mouth portion 21 of the cassette shell 20. The shading cylinder 25 has, in its bottom surface, an opening 25a and has, in its right and left surfaces, cutouts 25b.

A translucent hole 25c is formed in each side wall of the cassette shell 20 at a position offset slightly forwardly from the center (see FIG. 23). The cutouts 25b of the shading cylinder 25 can be viewed from the translucent holes 25c.

Referring to FIG. 2, the tape extraction portion 22 has, at its front end (opening) 22a, an outer side front end surface 22b, an inner side front end portion (which will be described below), an upper side front end surface 22c, and a lower side front end surface 22d. A cam portion 26 extending forwardly is formed on an approximately upper half of the outer side front end surface 22b. The outer side front end surface 22b is retreated slightly rearwardly from the inner, upper, and lower side front end surfaces. When the tape cassette 10 is inserted in a cassette holder (not shown), the outer side front end surfaces 22b, upper side front end surfaces 22c, and lower side front end surfaces 22d of both the tape extraction portions 22 are brought into contact with a stopper provided on the cassette holder, to thus act as a forwardly movement stopper for limiting the insertion of the tape cassette 10 in the cassette holder.

An in-cassette guide 22e having a semi-cylindrical shape is formed on the inner side wall surface of the tape extraction port 22 in such a manner as to extend to the above-described inner side front end portion of the opening 22a. In the non-loading state of the tape cassette 10, as shown in FIG. 7, the magnetic tape 30 is stretched between the tape extraction portions 22 in a state being wound around the in-cassette guides 22e.

Referring to FIGS. 11A, 11B, 12 and 13, an approximately rear half of the right side surface of the cassette shell 20 has, at a position near the lower end, a downward step portion 27a extending in the longitudinal direction, and an approximately rear half of the left side surface of the cassette shell 20 has, at a position near the lower end, a downward step portion 27b extending in the longitudinal direction. Each of the step portions 27a and 27b has, at its inner end portion, a groove.

Figure 9A:
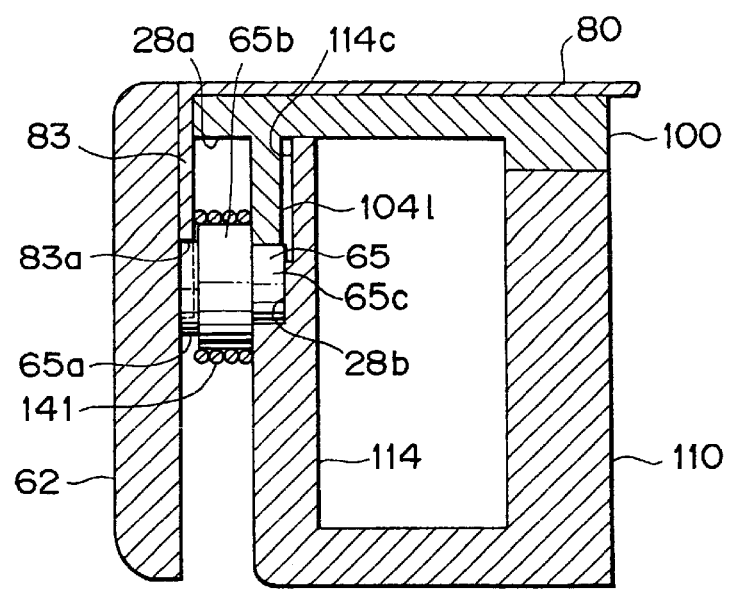
Figure 9B:
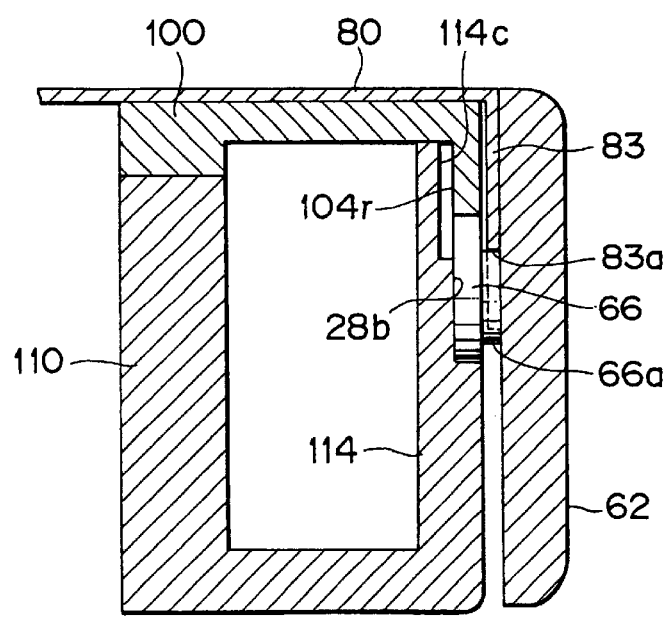

With respect to the right and left side surfaces of the cassette shell 20, as shown in FIG. 2 and FIGS. 9A and 9B, an approximately front half of the side surface is retreated slightly inwardly from the rear half of the side surface. The retreated degree on the left side is larger than that on the right side, and a hood-like portion 28a projecting outwardly is formed on an upper end of the front half on the left side surface.

Figure 12:
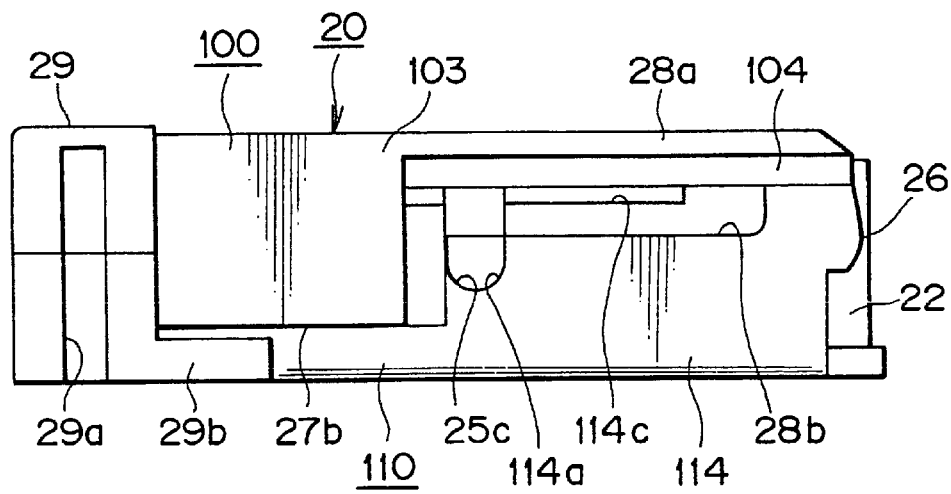
FIG. 12 is a left side view of a cassette shell of the tape cassette.
Figure 13:
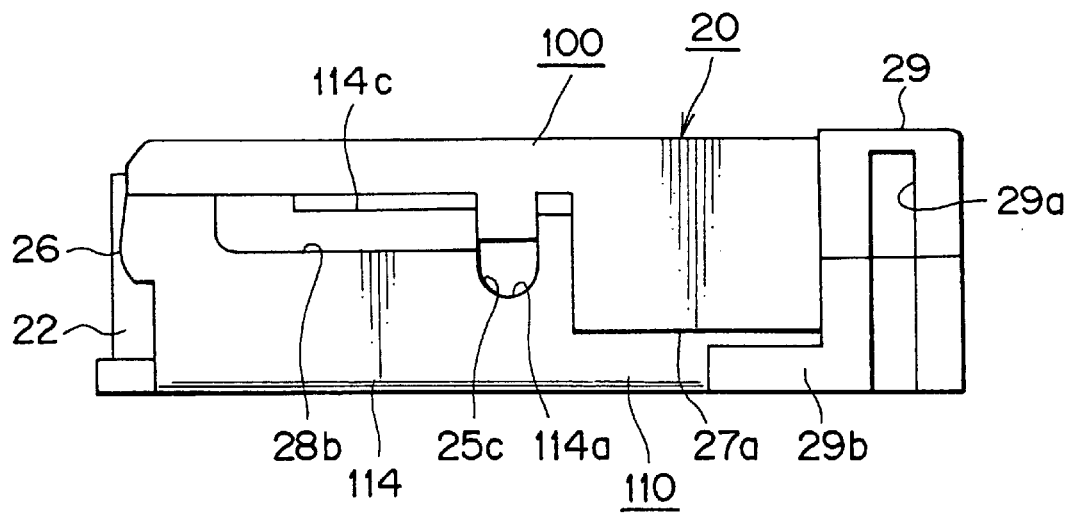
FIG. 13 is a right side view of the cassette shell of the tape cassette.

Each of the right and left side surfaces of the cassette shell 20 has, at a position near the upper end, a sliding groove 28b extending from the front end to the translucent hole 25c (see FIGS. 8, 12 and 13).

As a shown in FIGS. 1 and 2, a projection 29 is formed on a rear end portion of the cassette shell 20 in such a manner as to project leftwardly, rightwardly, and upwardly therefrom. Each of right and left side surfaces of the projection 29 has a groove 29a extending from a position near the upper end to the lower end. As shown in FIGS. 8, 11A, 11B, 12 and 13, a projecting rib 29b is formed on the lower end of the projection 29 in such a manner as to project slightly forwardly therefrom. A very small gap is formed between the upper end of the projecting rib 29b and each of the above-described step portions 27a and 27b.

Referring to FIG. 7, the cassette shell 20 is assembled by butting an upper shell 100 to a lower shell 110. Each of the above-described parts is shared between the upper and lower shells 100 and 110, or formed by joining the upper and lower shells 100 and 110 to each other.

Referring to FIGS. 4, 9A, 10A, and 11A, the upper shell 100 integrally includes an upper surface portion 101 constituting the entire upper surface of the cassette shell 20; a rear surface portion 102 constituting the upper half of the rear surface of the cassette shell 20; right and left side surface rear portions 103 each constituting most of an approximately rear half portion, excluding a lower end portion, of each of the right and left side surfaces of the cassette shell 20; right and left side surface front portions 104r and 104l each constituting an upper end portion of the remaining portion of each of the right and left side surfaces of the cassette shell 20; and right and left front surface portions 105 each constituting a portion, excluding a lower end portion, of each of the right and left side portions (excluding a central portion) of the depth surface of the mouth portion 21. The side surface front portions 104r and 104l are retreated slightly inwardly from the side surface rear portions 103. Further, the left side surface front portion 104l is formed at a position retreated slightly inwardly from the side edge of the upper surface portion 101, to form the above-described hood-like portion 28a.

Referring to FIG. 3, the lower shell 110 integrally includes a bottom surface portion 111 constituting the entire bottom surface of the cassette shell 20; a rear surface portion 112 constituting a lower half of the rear surface of the cassette shell 20; right and left side surface rear portions 113 each constituting an approximately rear half of each of the right and left side surfaces of the cassette shell 20; right and left side surface front portions 114 each constituting a portion, excluding an upper end portion, of the remaining portion of each of the right and left side surfaces of the cassette shell 20; a front surface central portion 115 constituting a central portion of the front surface of the cassette shell 20, that is, the depth surface of the mouth portion 21; right and left front surface side portions 116 each constituting a lower end portion of each of the right and left side portions (excluding the central portion) of the mouth portion 21; and right and left inner side surface portions 117 each constituting an inner side surface of each of the right and left tape extraction portions 22.

As shown in FIG. 3, a portion 113a, other than a portion corresponding to a lower end portion of the projection 29, of the side surface rear portion 113 of the lower shell 110 is positioned inwardly from the side surface rear portion 103 of the upper shell 100, to form a slight gap therebetween. A lower end portion of such a gap forms the above-described groove at the inner end portion of each of the step portions 27a and 27b.

As shown in FIG. 3, a rear end portion of the side surface front portion 114 of the lower shell 110 has, at its upper end, a cutout 114a opened upwardly. A portion, near the upper end, of the outer surface of each side surface front portion 114 has a shallow recess 114b which extends forwardly but excluding the front end portion, and further an upper end portion of the recess 114b has a shallow recess 114c which extends forwardly excluding the front end portion.

The inner surface, designated by reference numeral 114d, of each of the side surface front portions 114 is formed into a taper surface which becomes thinner as nearing the front end, whereby each of the tape extraction portions 22 becomes wider outwardly as nearing the opening 22a. With the aid of the taper surfaces 114d, as will be described in detail later, portions, extracted from the tape extraction portions 22, of the magnetic tape 30 can be spread outwardly, so that a possible arrangement region of each of tape extraction guides, which are provided in a tape drive apparatus, for extracting the magnetic tape 30, can be enlarged.

The stripe recesses 21a, described above as being formed in the depth surface of the mouth portion 21, are formed in the right and left front surface portions 105 of the upper shell 100 and in the right and left front surface side portions 116 of the lower shell 110 (see FIGS. 3 and 4). The reel base insertion holes 23, insertion hole 24, and shading cylinder 25 are formed in the bottom surface portion 111 of the lower shell 110. As shown in FIG. 2, the right cam portion 26 is formed on a front end portion of the right side surface front portion 114 of the lower shell 110, and the left cam portion 26 is formed on a front end portion of the left side surface front portion 114 of the lower shell 110 and a front end portion of the left side surface front portion 104l of the upper shell 100.

Figure 11A:
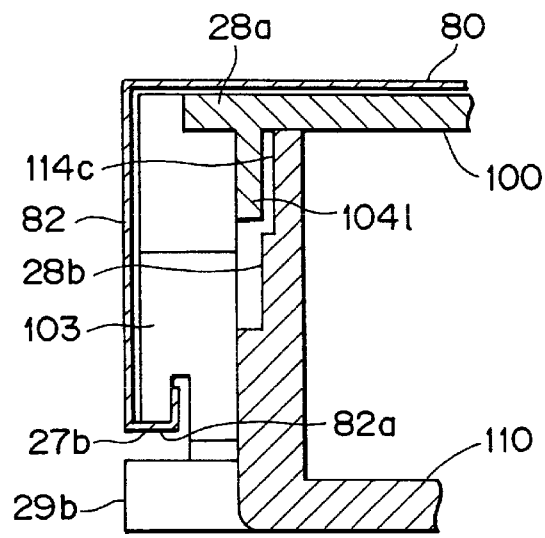
Figure 11B:
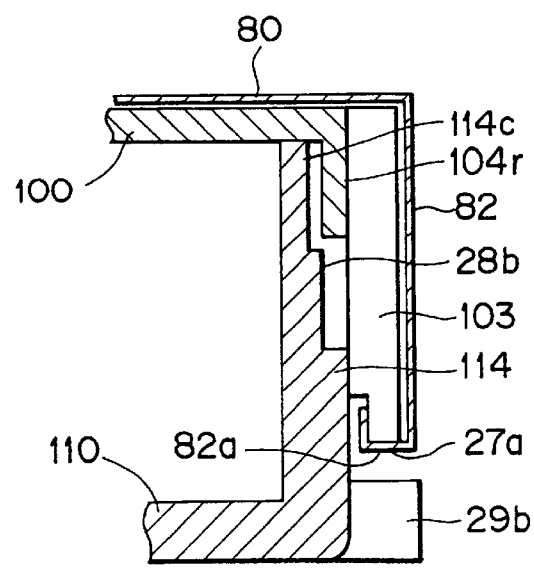

Each of the step portion 27a and 27b is formed by a lower end of each of the right and left side surface rear portions 103 (see FIGS. 11A and 11B).

The sliding groove 28b is formed between each of the right and left side surface front portion 104r and 104l of the upper shell 100 and the recess 114b formed in the upper end portion of each of the right and left side surface front portions 114 of the lower shell 110 (see FIGS. 10A, 10B, 11A, and 11B). A slight gap is formed by a recess 114c formed between each of the right and left side surface front portions 104r and 104l of the upper shell 100 and the upper end portion of each of the right and left side surface front portions 114 of the lower shell (see FIGS. 10A, 10B, 11A, and 11B).

The projection 29 is formed over the upper surface portion 101 and the right and left side surface rear portions 103 of the upper shell 100 and the right and left rear portions 113 of the lower shell 110 (see FIGS. 1 and 4).

The translucent holes 25c are formed by blocking the upper ends of the cutouts 114a formed in the right and left side surface front portions 114 of the lower shell 110 with the upper shell 100 (see FIGS. 12 and 13).

The cassette shell 20 is formed by butting the upper shell 100 to the lower shell 110 and joining them to each other with screws 120 (see FIG. 7).

Figure 5:
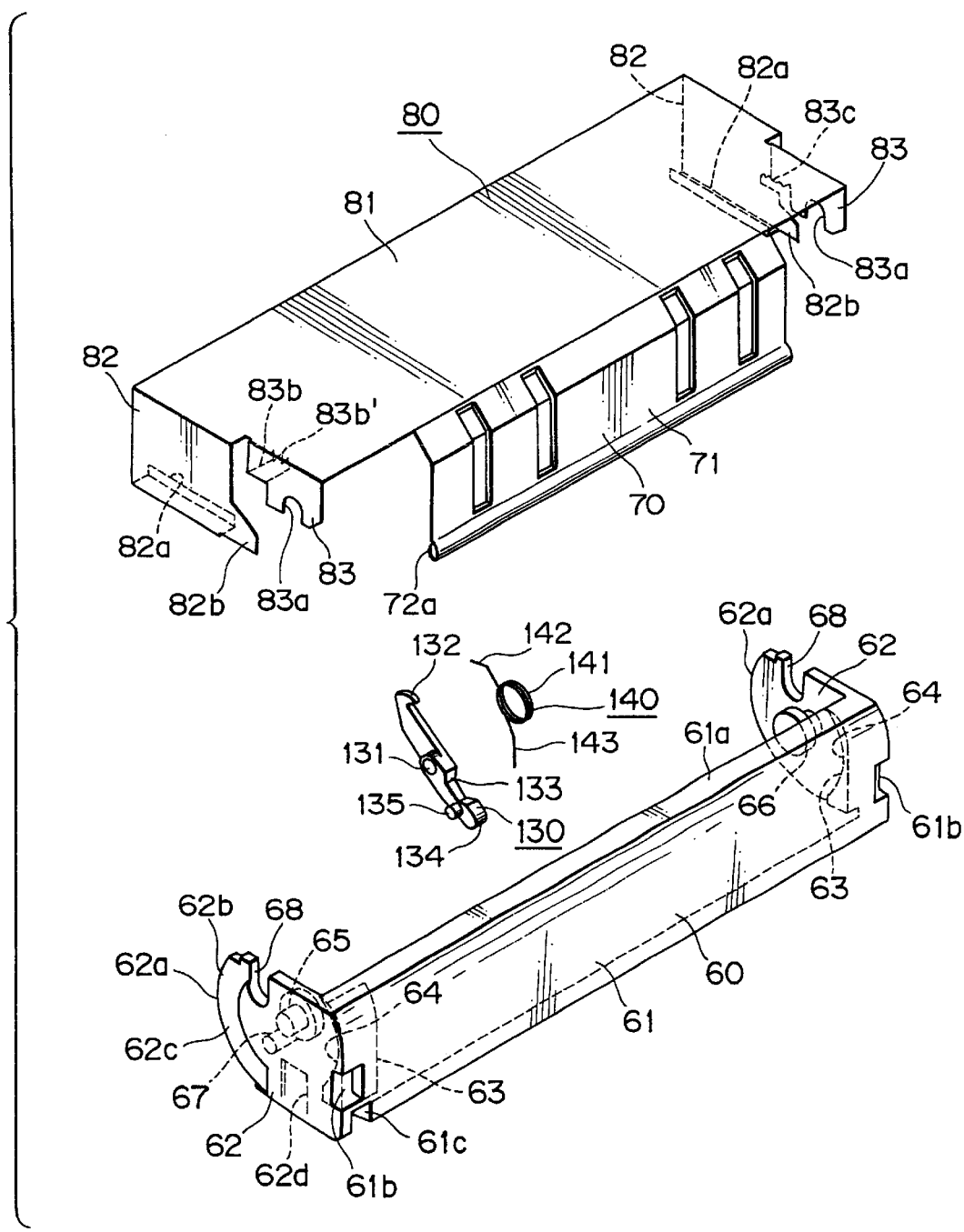
FIG. 5 is an exploded perspective view showing a slider unit of the tape cassette.

Referring to FIG. 5, the slider 80 is formed of a thin metal plate, preferably, a thin metal plate having an electrical conductivity. The slider 80 integrally includes an upper surface portion 81 formed of a plate extending longer in the lateral direction and side surface portions projecting downwardly from right and left side edges of the upper surface portion 81. Each side surface portion includes a principal surface portion 82 extending from a portion offset slightly forwardly from the center in the longitudinal direction to the rear end, and a lid supporting portion 83 positioned in front of the principal surface portion 82 (see FIG. 5).

Figure 10A:
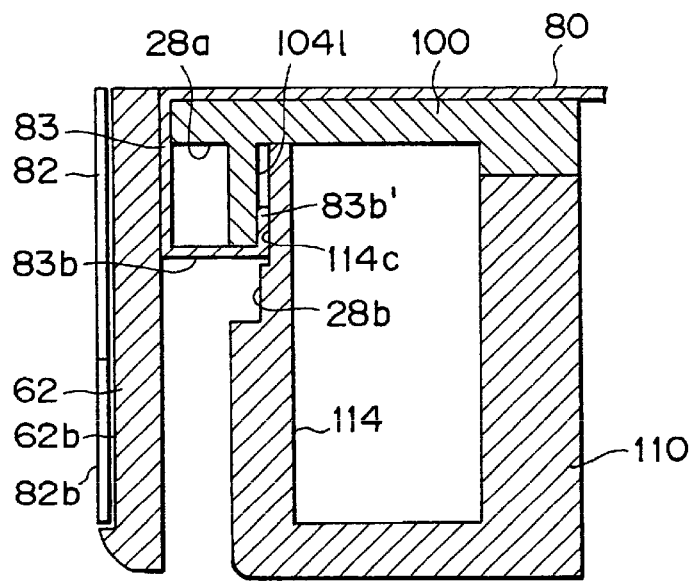
Figure 10B:
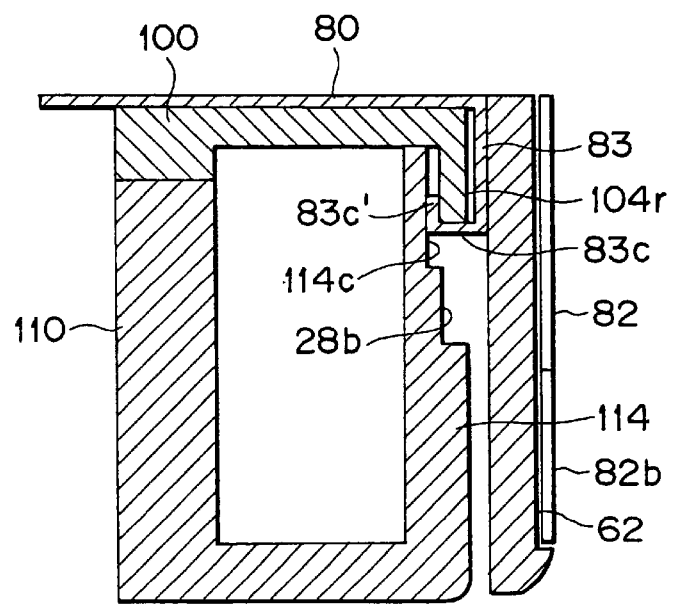

The lid supporting portion 83 is positioned slightly inwardly from the principal surface portion 82, and has a vertical width being nearly a half that of the principal surface portion 82 (see FIG. 5). As shown in FIGS. 5, 10A, and 10B, the right and left lid supporting portions 83 have semicircular shaft holding portions 83a opened downwardly, and also have, at the lower edges of rear end portions, sliding projections 83c and 83b projecting inwardly, respectively. The left sliding projection 83b is longer than the right sliding projection 83c. The sliding projections 83c and 83b have leading ends 83c' and 83b' bent upwardly, respectively.

As shown in FIGS. 5, 11A, and 11B, a lower end portion of each of the principal surface portions 82 is folded inwardly, to form a sliding engagement portion 82a having a U-shaped cross-section. An overlap portion 82b is provided on a lower end of the front edge of each of the principal surface portions 82 in such a manner as to project forwardly, slightly downwardly therefrom.

As shown in FIG. 5, a back lid 70 is integrally formed on the slider 80 in such a manner that the upper edge of the back lid 70 is integrated with the front edge of the upper surface portion 81 of the slider 80. The back lid 70 integrally includes a main portion 71 extending in the vertical direction and having a lateral width equal to the lateral width of the mouth portion 21, and a lower end closing portion 72 extending forwardly, slightly downwardly from the lower edge of the main portion 71. The lower end closing portion 72 is folded to the back side, that is, to the rear side, to form a folded portion 72a. The formation of the folded portion 72a is advantageous in that since any sharp edge is not formed at the lower end of the lower end closing portion 72, it is possible to prevent the magnetic tape 30, or a member on the tape drive apparatus side, for example, a pinch roller from being damaged by the back lid 70.

Figure 6:
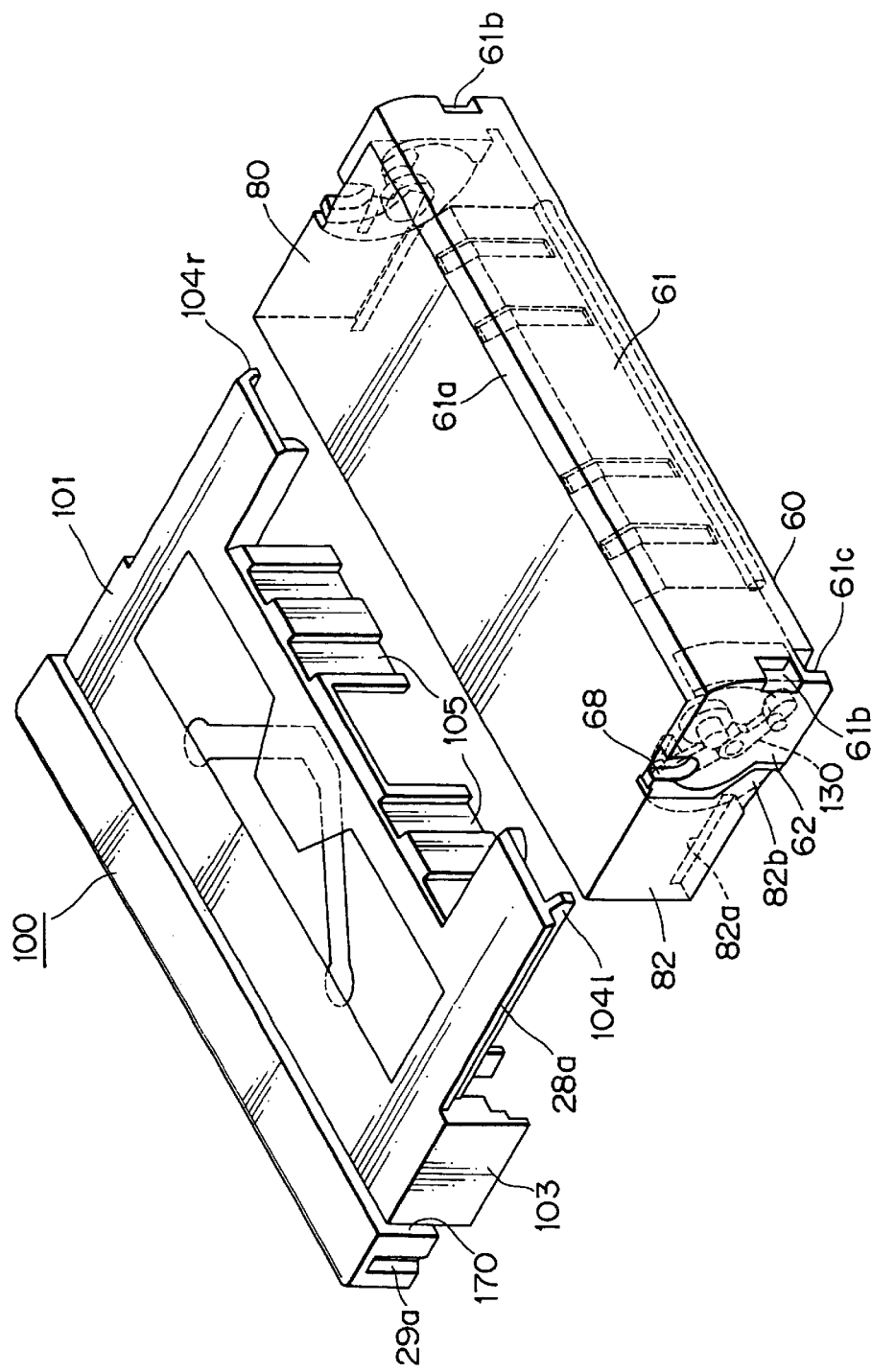
FIG. 6 is a perspective view showing the upper shell unit and the slider unit, located separately from each other, of the tape cassette.

The slider 80 is mounted on the cassette shell 20 in such a manner as to be slidable in the longitudinal direction, as follows:

When the slider 80 is slid rearwardly in a state in which the upper surface portion 81 of the slider 80 is mounted on the front end portion of the upper surface portion 101 of the upper shell 100 (see FIG. 6), the sliding engagement portions 82a of the slider 80 are slidably engaged with the lower edges of the side surface rear portions 103 of the upper shell 100 (see FIGS. 9A, 9B, 10A, and 10B), and further, the sliding projections 83c and 83b of the slider 80 are positioned on the back sides of the side surface front portions 104r and 104l of the upper shell 100 and the upwardly bent leading ends 83c' and 83b' of the slider 80 are engaged with the inner surfaces of the side surface front portions 104r and 104l of the upper shell 100 (see FIGS. 10A and 10B).

Referring to FIGS. 10A and 10B, when the upper shell 100 is joined to the lower shell 110, the sliding grooves 28b longer in the longitudinal direction are formed between the side surface front portions 104r and 104l of the upper shell 100 and the recesses 114b of the lower shell 110, and the sliding projections 83c and 83b of the slider 80 are slidably located at upper end portions of the sliding grooves 28b, that is, at the lower end portions of the recesses 114c and the upwardly bent leading ends 83c' and 83b' of the sliding projections 83c and 83b are located in the gaps formed between the side surface front portions 104r and 104l of the upper shell 100 and the recesses 114c of the lower shell 110, respectively. In this way, the slider 80 is mounted in the cassette shell 20 in such a manner as to be slidable in the longitudinal direction. The rear limit of the movement range of the slider 80 is determined by the contact of the rear end of the upper surface portion 81 of the slider 80 with the projection 29 of the cassette shell 20 (see FIG. 19), and the front limit of the movement range of the slider 80 is determined by the contact of a turning fulcrum shaft (which will be described later) of the front lid 60 supported by the slider 80 with the front ends of the sliding grooves 28b (see FIG. 14).

The front lid 60 is turnably supported by the lid supporting portions 83 provided at the front end portion of the slider 80 (see FIG. 5).

As shown in FIG. 5, the front lid 60 integrally includes a front surface portion 61 formed into a stripe shape extending substantially in the lateral direction, and right and left side surface portions 62 projecting rearwardly from right and left edges of the front surface portion 61. The front surface portion 61 has an upper end portion 61a gently curved in such a manner as to extend upwardly, rearwardly.

A thick wall portion 63 is formed at a portion being contact with a joining portion between the inner surface of each of the side surface portions 62 and the front surface portion. A restricting surface 64, formed into a circular-arc shape in a side view, is formed on the thick wall portion 63. Right and left turning fulcrum shafts 66 and 65 project from approximately central portions, facing to the restricting surfaces 64, of the inner surfaces of the right and left side surface portions 62. Annular grooves 66a and 65a are formed in base portions of the turning fulcrum shafts 66 and 65, respectively (see FIGS. 9A and 9B). A large-diameter portion 65b and a small-diameter portion 65c are provided adjacently to the annular groove 65a in this order on the left turning fulcrum shaft 65, and the overall length of the left fulcrum shaft 65 is longer than the right fulcrum shaft 66 (FIGS. 9A and 9B). The restricting surface 64 is formed into a circular-arc shape around each of the turning fulcrum shafts 66 and 65 (see FIG. 8).

As shown in FIG. 5, a rear end portion 62a of each of the right and left side surface portions 62 is formed into a circular-arc shape around each of the turning fulcrum shafts 66 and 65. A circular-arc shaped portion 62c, corresponding to the circular-arc shaped rear end portion 62a, of the outer surface of each of the right and left side surface portions 62 is made thin, to form a circular-arc shaped shallow thin wall portion 62b. The portion 62c, that is, the thin wall portion 62b is taken as an overlap portion.

A recess 62d opened downwardly is formed in a lower end portion of the inner side of the left side surface portion 62 (see FIG. 5).

A supporting shaft 67 is provided on the inner surface of the left side surface portion 62 at a position spaced rearwardly, downwardly from the turning fulcrum shaft 65 in such a manner as to project therefrom (see FIG. 5).

A translucent cutout 68 is formed in a portion, near the rear end, of the upper edge of each of the right and left side surface portions 62 (see FIG. 5).

An engagement recess 61b opened forwardly and sideways is formed in each of both side edge portions of the front surface portion 61 at a position near the lower end, and a through-cutout 61c is formed in a lower edge portion of the front surface portion 61 at a position near the left end (see FIG. 5).

The annular grooves 66a and 65a of the turning fulcrum shafts 66 and 65 of the front lid 60 are rotatably engaged in the shaft holding portions 83a of the slider 80, whereby the front lid 60 is turnably supported by the lid supporting portions 83 provided at the front end portion of the slider 80 (see FIG. 8). At this time, the overlap portions 82b formed on the principal surface portions 82 of the slider 80 are slidably positioned in the thin wall portions 62b of the side surface portions of the front lid 60 (see FIG. 8), whereby the outer surfaces of the principal surface portions 82 of the slider 80 and the outer surfaces of the side surface portions 62 of the front lid 60 are positioned in the same planes, that is, at the same levels (see FIGS. 10A and 10B).

A lid lock member 130 is mounted on the inner side of the left side surface portion 62 of the front lid 60 (see FIG. 5). The lid lock member 130 is formed into a slender shape and has at its central portion a supporting hole 131 (see FIG. 14). The supporting shaft 67 formed on the left side surface portion 62 of the front lid 60 is inserted in the supporting hole 131 of the lid lock member 130, whereby the lid lock member 130 is turnably supported by the left side surface portion 62.

Figure 14:
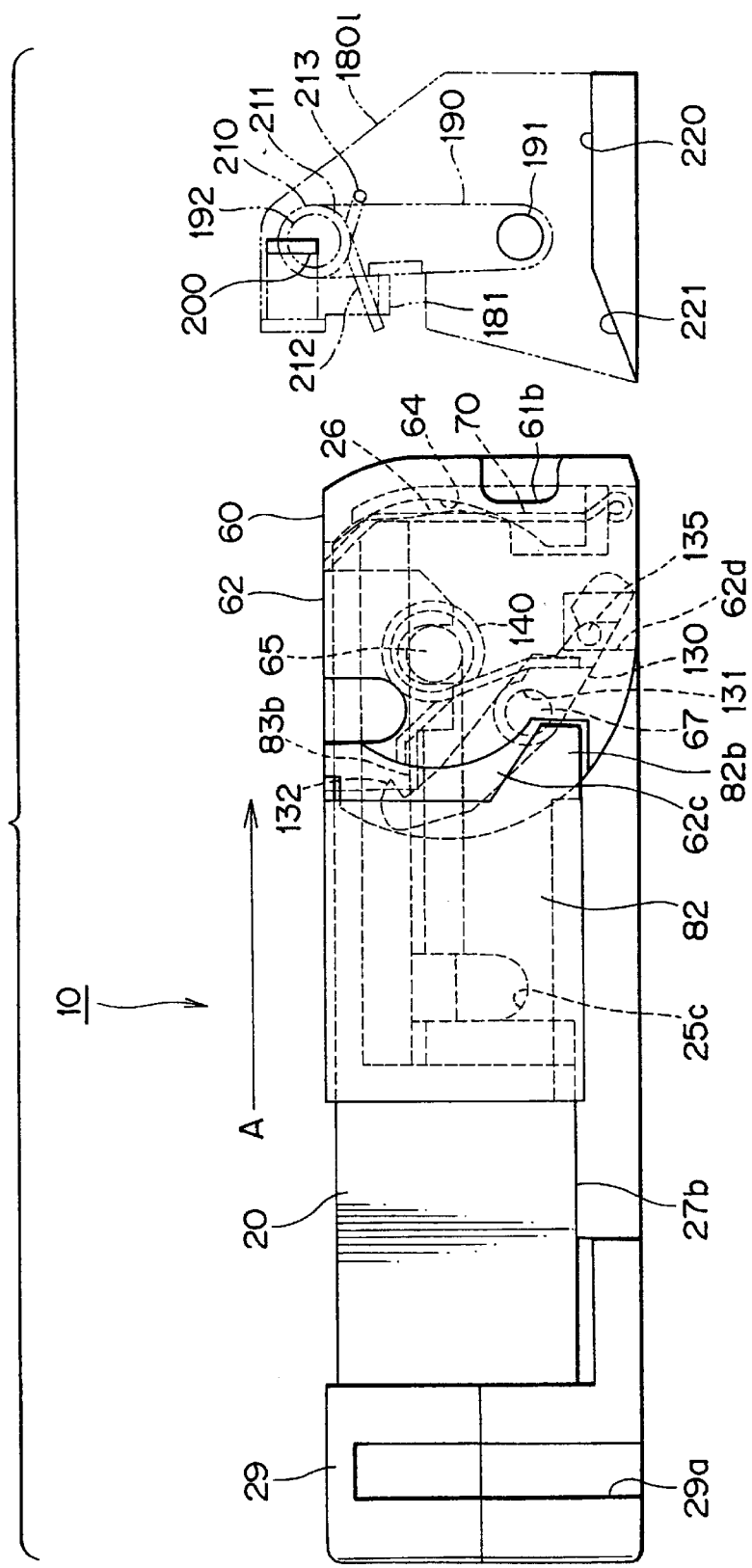
FIG. 14 is a schematic side view showing a state immediately before the tape cassette is inserted in the cassette holder.

A locking claw 132 is formed on an upper end portion of the lid lock member 130 in such a manner as to project nearly forwardly therefrom. As shown in FIG. 14, when the lid lock member 130 is tilted rightwardly, downwardly as seen from the left side, the locking claw 132 locks, from the rear side, the upper surface of the sliding projection 83b formed on the left lid supporting portion 83 of the slider 80. A portion, located between the supporting hole 131 and the lower end, of the lid lock member 130 on the side facing to the left side surface portion 62, is cutout to form a spring catch surface 133 (see FIG. 5). A front portion 134 of the lower end surface of the lid lock member 130 is formed into a circular-arc shape. The lid lock member 130 also has a lock pin 135 projecting from a portion, near the lower end, of the left side surface facing to the left side surface portion 62 of the front lid 60. As shown in FIG. 14, the lock pin 135 is positioned in the recess 62d formed in the left side surface portion 62 of the front lid 60.

A torsion-coil spring 140 is provided for biasing each of the front lid 60 and the lid lock member 130 in a specific direction.

A coil portion 141 of the torsion-coil spring 140 is mounted around the large-diameter portion 65b of the turning fulcrum shaft 65 formed on the left side surface portion 62 of the front lid 60 (see FIG. 9A), and one arm piece 142 is brought, from the front side, into elastic-contact with the upper surface of the sliding projection 83b formed on the left lid supporting portion 83 of the slider 80 while the other arm piece 143 is brought into elastic-contact with the spring catch surface 133 of the lid lock member 130 (see FIG. 14). With this mounting of the torsion-coil spring 140, the lid lock member 130 is biased clockwise as seen from the left side, and the front lid 60 is biased, via the lid lock member 130 and the supporting shaft 67, clockwise as seem from the left side, that is, in the direction in which the front side of the mouth portion 21 is closed with the front surface portion 61 of the front lid 60.

The lid lock member 130 and the torsion-coil spring 140, which are positioned inside the left side surface portion 62 of the front lid 60 as described above, are not exposed to the outside even when the front lid 60 is turned to be opened. Accordingly, it is impossible for an operator to touch the lid lock member 130 and the torsion-coil spring 140 with his or her fingers or remove them unless the slider 80 is removed from the cassette shell 20. In addition, since the lid lock member 130 not only locks the front lid 60 in the closed state but also presses the front lid 60 and the slider 80 with an elastic force of the torsion-coil spring 140 whose arm piece 143 is caught by the spring catch surface 133 of the lid lock member 130, it is possible to eliminate the looseness, caused by mounting, of each of the front lid 60 and the slider 80.

Referring to FIG. 3, a memory containing groove 118 is formed in a right side rear end portion of the lower shell 110, and an in-cassette memory 150 is contained in the memory containing groove 118. The in-cassette memory 150 includes a horizontally elongated rectangular board 151, a memory device 152 mounted on a central portion of the board 151, and communication antennas 153 formed on front and back surfaces of the board 151. The communication antenna 153 is formed of a spiral conductive pattern. The in-cassette memory 150 communicates with external equipment via the antennas 153, and records data such as the kinds of magnetic tapes and recording contents.

As shown in FIG. 4, one-end portions of two reel pressing springs 160 are fixed to the back side of the upper surface portion 101 of the upper shell 100. The central portions of the upper surfaces of the tape reels 40 and 50 are pressed down to the bottom surface portion 111 of the lower shell 110 by the other end portions of the reel pressing springs 160.

The tape cassette 10 configured as described above is assembled in the following procedure: namely, in a first step, a lower shell unit is formed by sub-assembling respective members in the lower shell 110, an upper shell unit is formed by sub-assembling respective members in the upper shell 100, and a slider unit is formed by supporting the front lid 60, in which the lid lock member 130 and the like are previously sub-assembled, on the slider 80; and in a second step, the slider unit is assembled in the upper shell unit, and the upper shell unit, in which the slider unit has been thus assembled, is joined to the lower shell unit (see FIGS. 3 to 7).

To be more specific, the lower shell unit is formed by sub-assembling the tape reels 40 and 50 around which the magnetic tape 30 is wound, the reel lock members 90, the in-cassette memory 150, and the like in the lower shell 110 (see FIGS. 3 and 7). The upper shell unit is formed by sub-assembling the reel pressing springs 160 in the upper shell 100 (see FIG. 4). The slider unit is formed by supporting the front lid 60, in which the lid lock member 130 and the torsion-coil spring 140 have been sub-assembled, on the slider 80 (see FIG. 5).

Figure 20A:
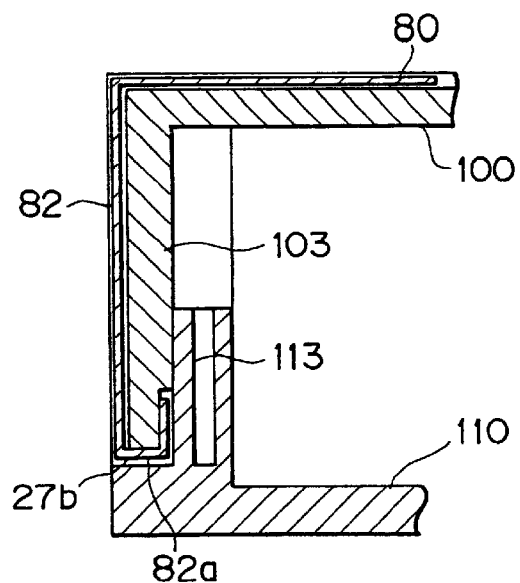
Figure 20B:
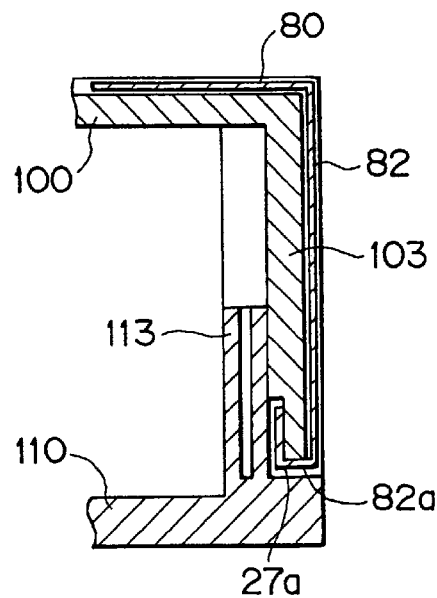

The slider unit is assembled in the upper shell unit in a state in which the front lid 60 is turned upwardly. That is to say, the upper surface portion 81 of the slider 80 is placed on the front end portion of the upper surface portion 101 of the upper shell 100, and in such a state, the slider 80 is slid rearwardly, so that the sliding engagement portions 82a of the slider 80 are slidably engaged on the lower edges of the side surface portions 103 of the upper shell 100 (see FIGS. 20A and 20B). At the same time, the sliding projections 83c and 83b of the slider 80 are positioned on the back sides of the side surface front portions 104r and 104l of the upper shell 100 and the upwardly bent leading ends 83c' and 83b' of the sliding projections 83c and 83b are engaged on the inner surfaces of the side surface front portions 104r and 104l (see FIGS. 6 and 7). The state in which the slider unit formed by sub-assembling the front lid 60 in the slider 80 is assembled in the upper shell unit is shown in FIG. 7.

The upper shell unit in which the slider unit has been assembled is joined to the lower shell unit. To be more specific, the lower ends of respective portions of the upper shell 100 in the upper shell unit are butted to the upper ends of respective portions of the lower shell 110 in the lower shell unit, and in such a state, the slider 80 is slid to the front end and the front lid 60 is turned downwardly, whereby the small-diameter portion 65c of the left turning fulcrum shaft 65 of the front lid 60 is slidably engaged in the sliding groove 28b formed in the left side surface of the cassette shell 20, and the right turning fulcrum shaft 66 is slidably engaged in the sliding groove 28b formed in the right side surface of the cassette shell 20 (see FIGS. 9A and 9B). As a result, the turning fulcrum shafts 66 and 65 of the front lid 60 can be moved in the longitudinal direction with their vertical movement limited by the sliding grooves 28b.

The upper shell 100 is then joined to the lower shell 110 with a plurality of screws 120 (see FIG. 7), to accomplish the tape cassette 10 (see FIG. 1).

Since all of the components of the tape cassette 10 are sub-assembled into the lower shell unit, upper shell unit, and slider unit, and these units are assembled in accordance with the above-described sequence, it is possible to facilitate the parts control during assembling and to simplify the assembly.

In the non-loading state of the tape cassette 10, the front side of the magnetic tape 30 is covered with the front lid 60, the back side thereof is covered with the back lid 70, the lower side thereof is covered with the lower end closing portion 72 of the back lid 70, and the upper side thereof is covered with the upper end portion 61a of the principal surface portion 61 of the front lid 60 (see FIG. 1). Accordingly, it is possible to prevent the adhesion of dust on the magnetic tape 30 and also prevent the contact of foreign matters with the magnetic tape 30 and the touch of fingers on the magnetic tape 30. Since the front end surfaces 22b, 22c and 22d and the like of the tape extraction portions 22 are covered with the front surface portion 61 of the front lid 60, they can exhibit a good external appearance (see FIG. 1). The locking claw 132 of the lid lock member 130 locks, from the rear side, the upper surface of the sliding projection 83b of the slider 80, whereby the front lid 60 is locked at the closed position shown in FIG. 1.

While not shown, an erroneous erasing preventive tag is provided on the back surface of the cassette shell 20. The movement of the erroneous erasing preventive tag in the height direction of the cassette shell 20 brings either a possible recording state or an impossible recording state.

Since the lid supporting portions 83 of the slider 80 are retreated inwardly from the principal surface portions 82 (see FIG. 5), the outer surfaces of the side surface portions 62 of the front lid 60 supported by the lid supporting portions 83 are nearly at the same levels as those of the outer surfaces of the principal surface portions 82 of the slider 80

(see FIG. 2). As a result, only a slight step 170 is formed between the projection 29 and an approximately rear half of each side surface of the cassette shell 20, that is, a surface, excluding the rear end portion, of each of the side surface rear portions 103 of the upper shell 100, which is in contact with each of the principal surfaces 82 of the slider 80 (see FIGS. 1 and 2). The step 170 is equivalent to the thickness of each of the principal surface portions 82 of the slider 80.

The loading/unloading of the tape cassette 10 in or from a tape drive apparatus will be described below.

Figure 15:
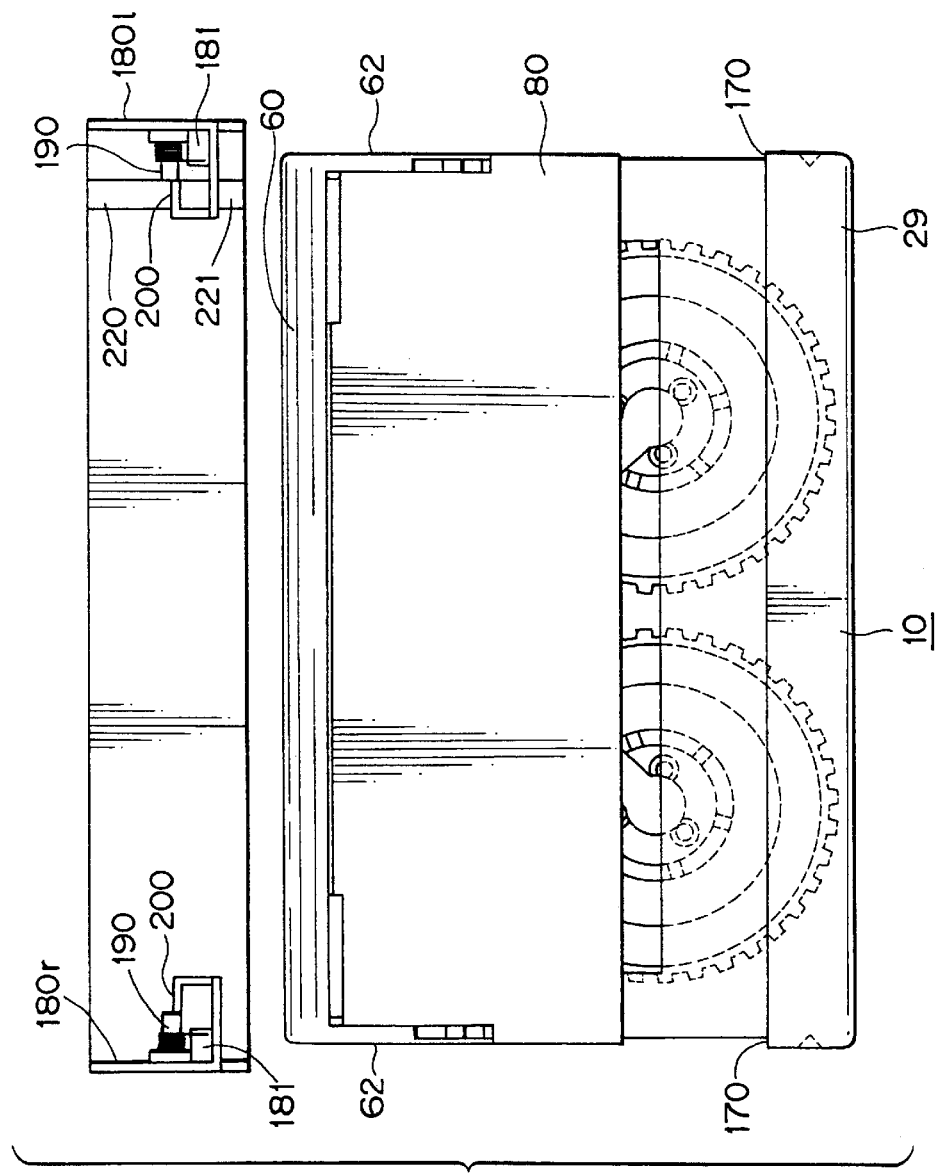
FIG. 15 is a schematic plan view showing the state immediately before the tape cassette is inserted in the cassette holder.

Referring to FIGS. 14 and 15, a cassette holder (not shown) for holding the tape cassette 10 and mounting the tape cassette 10 at a specific position of the tape drive apparatus has, at positions corresponding to those of both the ends of the tape cassette 10, plate-like supporting members 180r and 180l. Lid openers 190 and lid pressing projections 200 are provided on the supporting members 180r and 180l.

Referring to FIG. 14, an upper end portion of the lid opener 190 formed into a long-arm shape is turnably supported on an upper end portion of the inner surface of each of the supporting members 180r and 180l. An engagement projection 191 projects from the inner surface of a turning end portion of the lid opener 190. A coil portion 211 of a torsion-coil spring 210 is wound around a turning shaft 192 of the lid opener 190. One arm 212 is brought, from the upper side, into elastic-contact with a spring catch piece 181 which is formed by cutting part of each of the supporting members 180r and 180l and raising it inwardly, and the other arm 213 is brought into elastic-contact with a portion, near the turning fulcrum, of the front edge of the lid opener 190. With this mounting of the torsion-coil spring 210, the lid opener 190 is biased clockwise as seen from the left side, and is held in an upright posture with its turning end located at the lowermost position by the contact of the portion, near the upper end, of the lid opener 190 with the spring catch piece 181.

The lid pressing projection 200 is formed on the upper end portion of each of the supporting members 180r and 180l in such a manner as to project inwardly therefrom (see FIG. 15).

The left supporting member 180l has a lock releasing cam 220 positioned at a portion, near the right side surface, of a base end of the left supporting member 180l (see FIG. 15). An end surface, on the tape cassette insertion side, of the lock releasing cam 220 is taken as a tilt portion 221 (see FIG. 14). The lateral width of the lock releasing cam 220 is slightly smaller than the width of the through-cutout 61c formed in the front surface portion 61 of the front lid 60 (see FIG. 15).

When the tape cassette 10 is inserted in the cassette holder, with its front side, that is, its front lid side taken as the head in forward movement, in the direction A shown in FIG. 14, the front end portion of the tape cassette 10 enters between the supporting members 180r and 180l (see FIG. 15), and the lock releasing cam 220 is relatively inserted in the front lid 60 through the though-cutout 61c formed in the front surface portion 61 of the front lid 60. At this time, since the steps 170 formed on the rear end portion of the cassette shell 20 are very small, they are not caught by an entrance or the like of the cassette holder (see FIG. 15).

Figure 16:
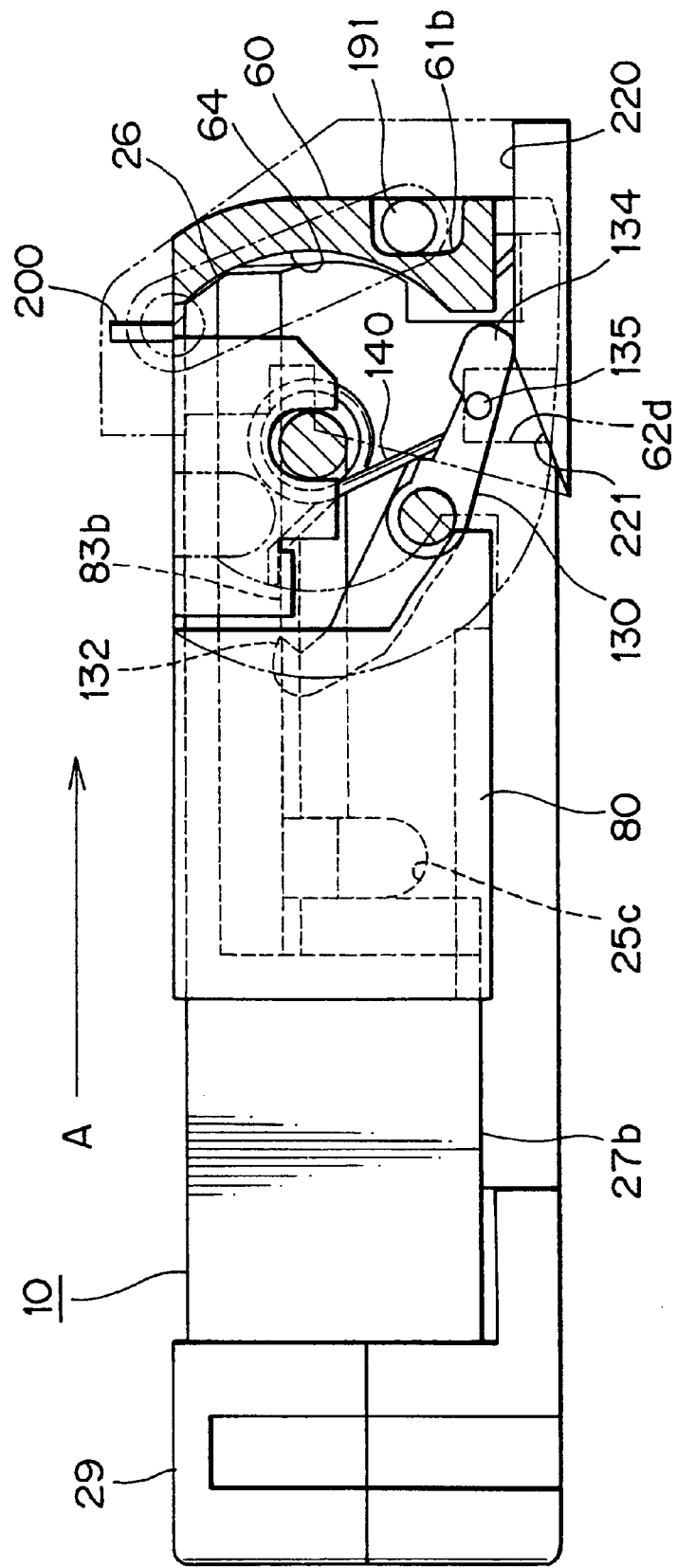
FIG. 16 is a schematic side view showing a state in which the locking by a lid lock member is released, with an essential portion cutaway.

The engagement projections 191 of the lid openers 190 are engaged in the engagement recesses 61b of front lid 60. At the same time, the circular-arc surface portion 134 at the lower end of the lid lock member 130 is slid upwardly on the tilt portion 221 of the lock releasing cam 220, whereby the lid lock member 130 is turned counterclockwise in FIG. 16, to release the engagement of the locking claw 132 with the sliding projection 83b of the slider 80, with a result that the locking of the front lid 60 to the closed position is released (see FIG. 16). At this time, the lock pin 135 of the lid lock member 130 is moved in the recess 62d formed in the inner surface of the left side surface portion 62 of the front lid 60.

Figure 17:
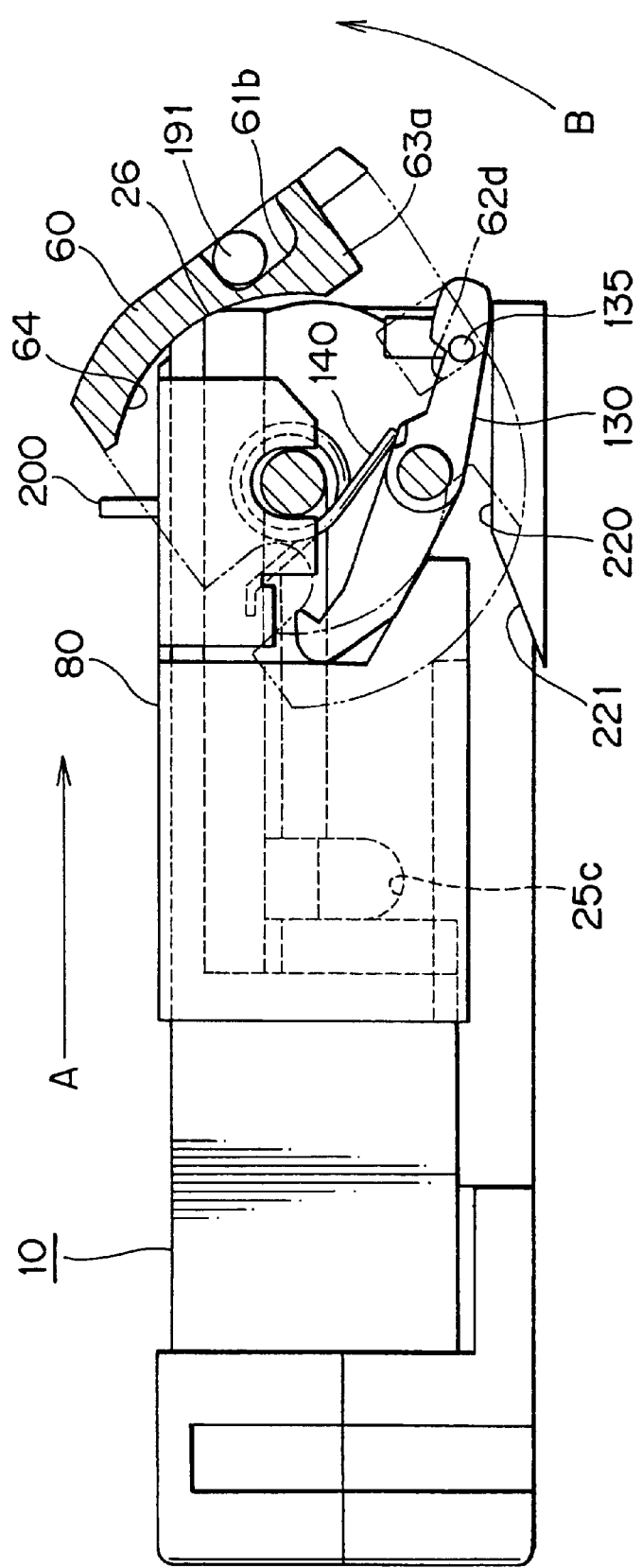
FIG. 17 is a schematic side view showing a state subsequent to the state shown in FIG. 16, with the essential portion cutaway.

When the tape cassette 10 is further inserted in the cassette holder in the direction A, the engagement projections 191 provided at the turning ends of the lid openers 190 are pushed in the direction A, and thereby the lid openers 190 are turned counterclockwise, that is, in the direction B in FIG. 17. As the engagement projections 191 are further moved upwardly in the direction B, the front lid 60 having the engagement recesses 61b in which the engagement projections 191 are engaged is turned counterclockwise in the direction B (see FIG. 17). In such a state, the lock pin 135 of the lid lock member 130 is caught by an edge portion of the recess 62d of the left side surface portion 62 of the front lid 60 (see FIG. 17).

In addition, a force acting to move the slider 80 rearwardly relative to the cassette shell 20 is applied to the slider 80 by the engagement projections 191 of the lid openers 190 via the front lid 60; however, since the restricting surfaces 64 of the front lid 60 are in contact with the cam portions 26 of the cassette shell 20, the slider 80 is not moved rearwardly relative to the cassette shell 20 and only the front lid 60 is turned upwardly (see FIG. 17).

In the state shown in FIG. 17, the lock pin 135 of the lid lock member 130 is in contact with the inner edge on the rear side of the recess 62d formed in the left side surface portion 62 of the front lid 60, and as the front lid 60 is further turned in the direction B from this state, the lock pin 135 is pulled in the direction B by the inner edge on the rear side of the recess 62d, and consequently the lid lock member 130 is also turned in the direction B. In this case, since the lid lock member 130 is biased in the direction opposed to the direction B by the torsion-coil spring 140, the lock pin 135 is held in the state being in elastic-contact with the inner edge of the rear side of the recess 62d (see FIGS. 17, 18 and 19).

When the front lid 60 is turned at 90° from the initial state (closed state shown in FIG. 14) in the direction B, the engagement between the restricting surfaces 64 of the front lid 60 and the cam portions 26 of the cassette shell 20 is released (see FIG. 18), so that the slider 80 becomes movable rearwardly relative to the cassette shell 20. In the state shown in FIG. 18, the lid pressing projections 200 formed on the supporting members 180r and 180l are closer, from the rear side, to the upper end of the front surface portion 61 of the front lid 60. In addition, since the overlap portions 82b of the slider 80 are positioned outside the overlap portions 62c of the side surface portions 62 of the front lid 60, the outsides of the overlap portions 62c, which are the rear end portions of the side surface portions 62, are supported by the overlap portions 82b of the slider 80 during turning of the front lid 60. As a result, the front lid 60 can be stably, smoothly turned.

Figure 18:
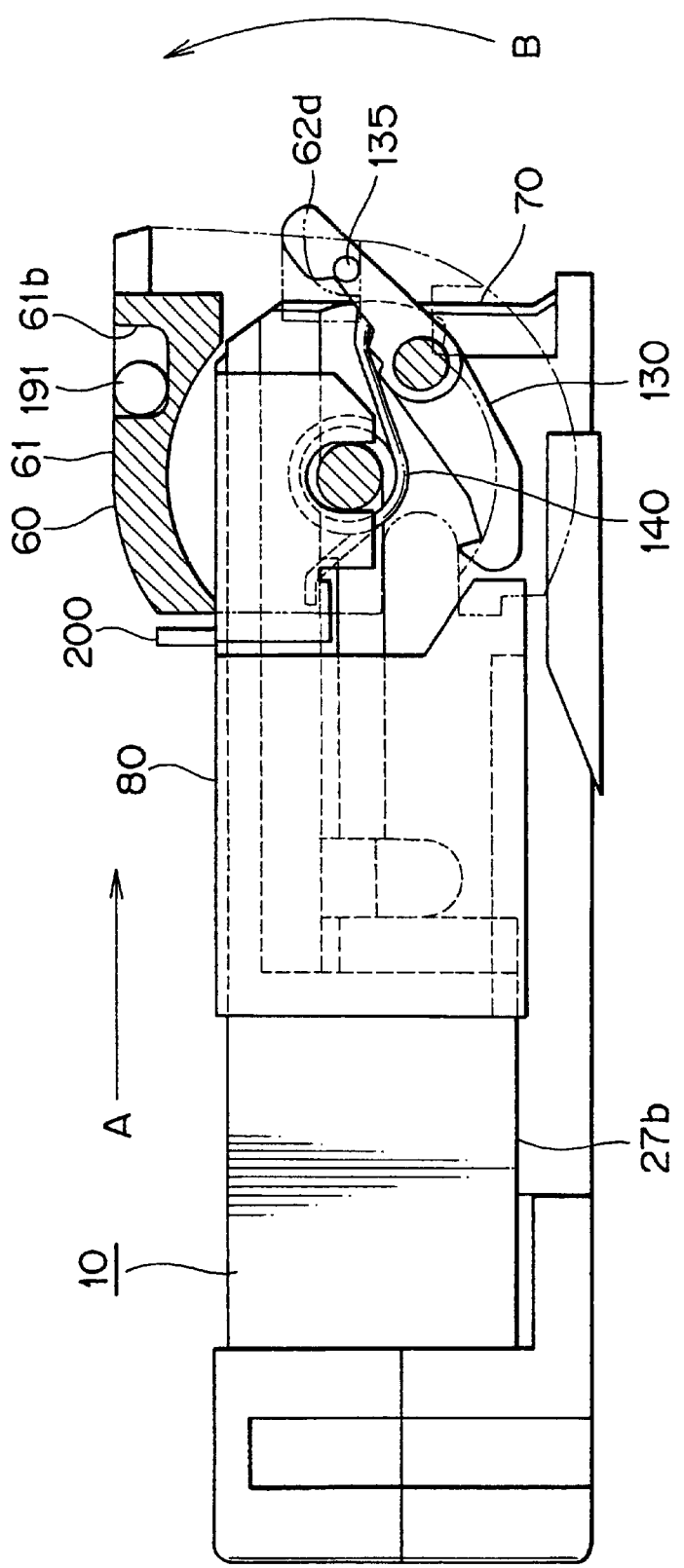
FIG. 18 is a schematic side view showing a state in which the front lid reaches a lid opened position, with an essential portion cutaway.
Figure 19:
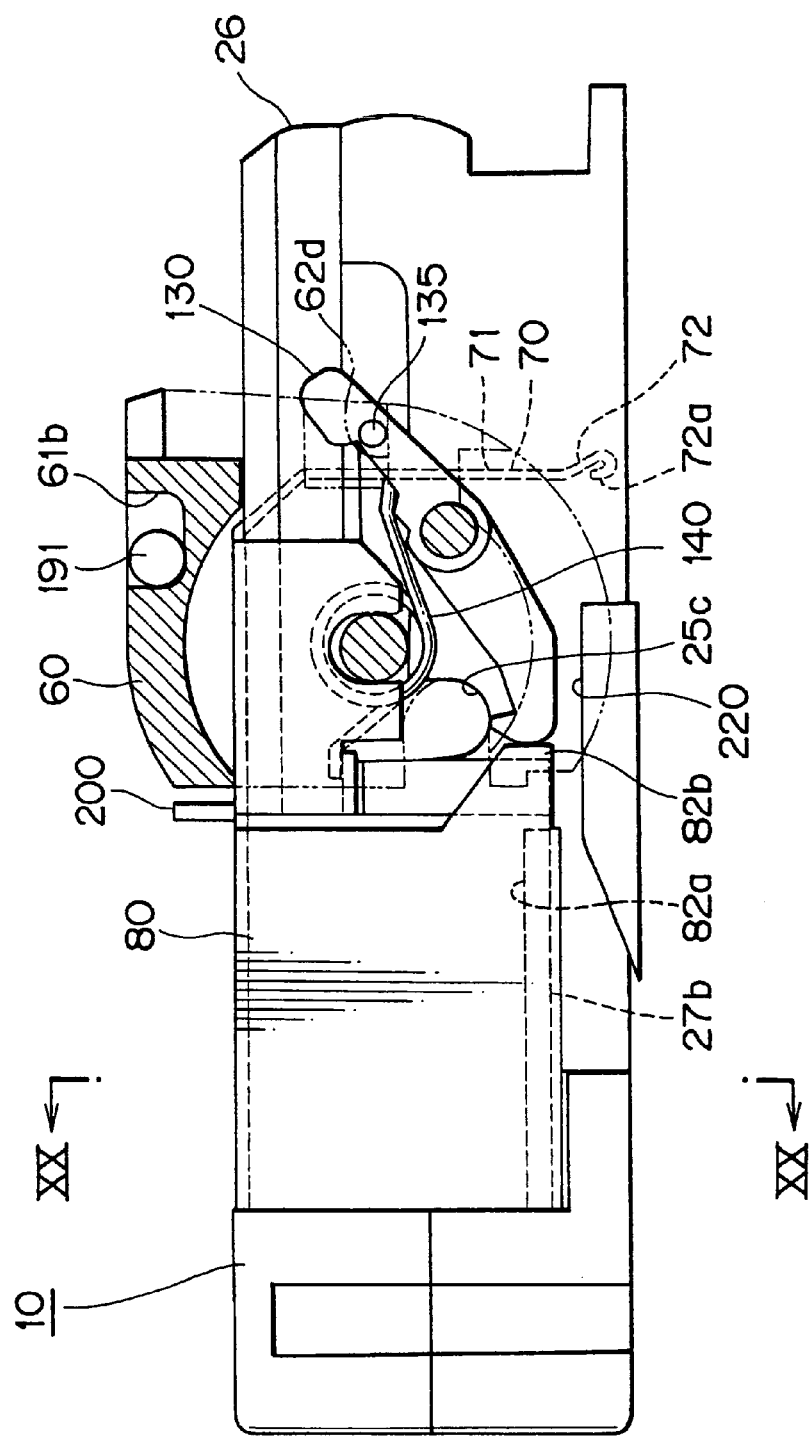
FIG. 19 is a schematic side view showing a state in which the slider is retreated and both the front lid and back lid reach lid opened positions, with an essential portion cutaway.

When the tape cassette 10 is further moved from the state shown in FIG. 18 to the depth side of the cassette holder, that is, in the direction A, since the engagement projections 191 of the lid openers 190 are engaged in the engagement recesses 61b of the front lid 60, the front lid 60 and the slider 80 supported by the front lid 60 cannot be moved in the direction A, that is, left as they are, with a result that the slider 80 are moved, together with the front lid 60, rearwardly relative to the cassette shell 20 (see FIGS. 18 and 19). At this time, the back lid 70 is of course moved rearwardly relative to the cassette shell 20.

The back lid 70 is linearly moved rearwardly to be spaced from the magnetic tape 30 (see FIG. 19), and accordingly, as compared with the related art back lid configured to be moved rearwardly, obliquely upwardly by making use of a cam to be thus spaced from the magnetic tape, the back lid 70 is advantageous in that the magnetic tape 30 is less entangled in the back lid 70 and thereby the magnetic tape 30 is prevented from being damaged due to the entanglement thereof in the back lid 70. Since the back lid 70 formed of a conductive metal plate is integrally formed on the slider 80, the back lid 70 is less electrified and thereby it does not attract the magnetic tape 30 with static electricity. As a result, it is possible to prevent occurrence of an accident in which the magnetic tape 30 runs over a guide or the like at the time of mounting of the magnetic tape 30 at a specific mounting position.

The insertion of the tape cassette 10 in the cassette holder is ended when the front end surfaces 22b, 22c, and 22d, functioning as the forward movement stoppers, of the tape extraction portions 22 are brought into contact with a stopper (not shown) provided on the cassette holder (see FIG. 19).

In the state in which the tape cassette 10 is located at the insertion ended position, the back lid 70 is retreated to the deepest portion of the mouth portion 21, and the translucent cutouts 68 formed in the side surface portions 62 of the front lid 60 are aligned to the translucent holes 25c formed in the side surfaces of the cassette shell 20. In the non-loading state of the tape cassette 10, the translucent holes 25c of the cassette shell 20 are closed with the principal surface portions 82 of the slider 80 in order to prevent the permeation of foreign matters such as dust in the cassette shell 20 through the translucent holes 25c.

By the way, it is required to press down the tape cassette 10 for preventing the tape cassette 10 from being floated upwardly from the cassette holder. In this case, it may be desirable to press down the tape cassette 10 via the slider 80 made from a metal, and further, to prevent the electrification of the back lid 70, it may be desirable to bring a slider pressing member, which is made from a conductive material, into contact with a ground member of the cassette holder.

Since the front lid 60 is brought into elastic-contact with the upper surface of the cassette shell 20, the elastic force of the torsion-coil spring 140 does not act to float the cassette shell 20 upwardly from the cassette holder. According to the related art configuration, since the opening state of the front lid is held by a lid opening member provided on the tape drive apparatus side, an elastic force of a spring for biasing the front lid in the lid closing direction is applied to the lid opening member, and a reaction force against the biasing force acts to float the cassette shell upwardly from the cassette holder. On the contrary, according to the tape cassette 10, the elastic force of the torsion-coil spring 140 only acts to bring the front lid 60 into elastic-contact with the upper surface of the cassette shell 20 (see FIG. 19).

Further, since the lock pin 135 of the lid lock member 130 is brought into elastic-contact with the inner edge of the rear side of the recess 62d of the left side surface portion 62 of the front lid 60, the elastic force of the torsion-coil spring 140 does not act to float the cassette shell 20 upwardly from the cassette holder via the lid lock member 130. To be more specific, although the lid lock member 130 is biased in the locking direction by the elastic force of the torsion-coil spring 140, when the lid lock member 130 comes to be in the unlocking state, the lock pin 135 of the lid lock member 130 is brought into elastic-contact with and held by the recess 62d of the front lid 60 being in elastic-contact with the upper surface of the cassette shell 20 (see FIG. 19).

As described above, in this embodiment, the front lid 60 and the back lid 70 can be sequentially moved to respective lid opened positions by using a simple lid opening structure, that is, the lid openers 190 functioning as turning arms. To be more specific, since the cam portions 26 of the cassette shell 20 are engaged with the restricting surfaces 64 of the front lid 60, the front lid 60 is first turned to the opened position, and then the back lid 70 is moved to the opened position by retreating the slider 80 (see FIGS. 14 to 19).

After the tape cassette 10 is inserted in the cassette holder (not shown) up to the above-described insertion ended position, the cassette holder is moved (generally, downwardly) up to a specific position, to mount the tape cassette 10 at a specific mounting position in the tape drive apparatus.

Figure 26:
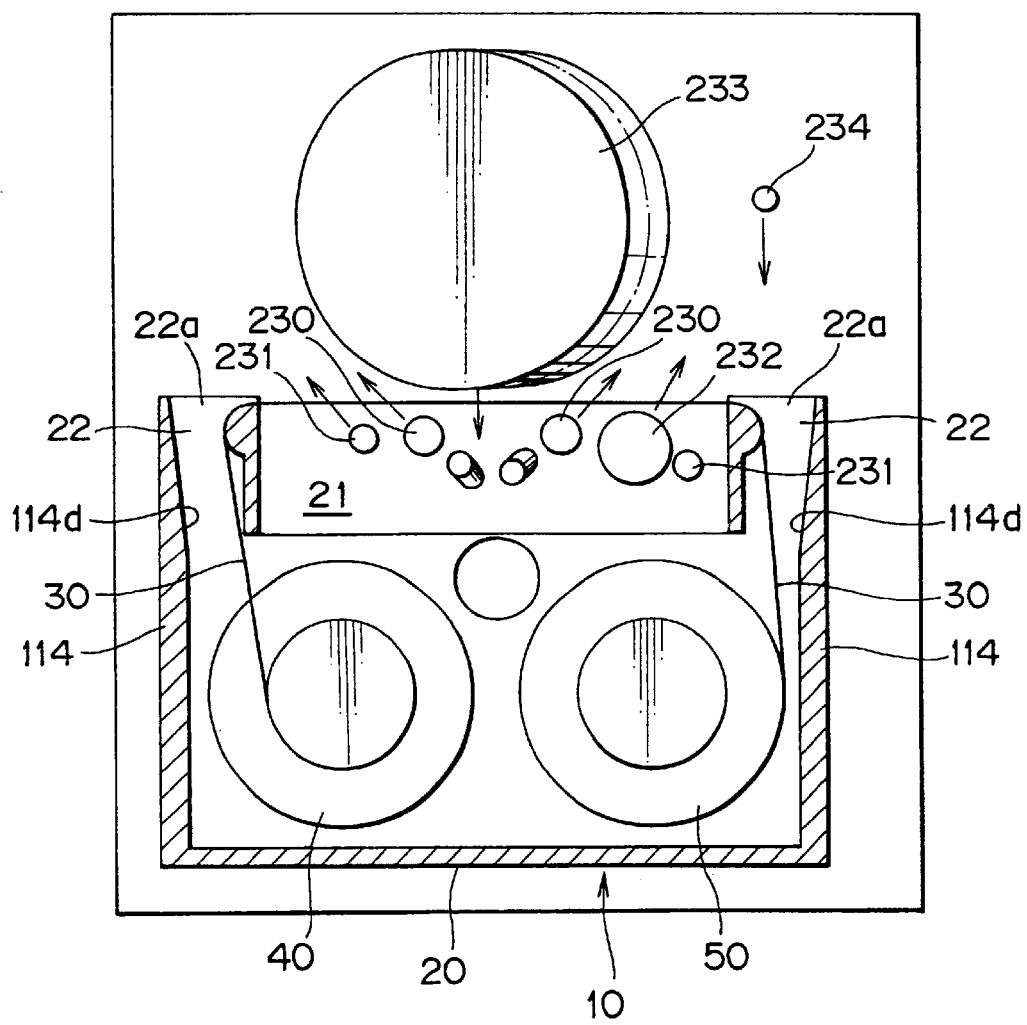
FIG. 26 is a schematic plan view showing a state in which the tape cassette is mounted in the tape drive apparatus but the tape is not loaded therein.

After the tape cassette 10 is mounted at the specific mounting position, reel bases (not shown) are inserted in the cassette shell 20 though the reel base insertion holes 23. Subsequently, the tape reels 40 and 50 are mounted on the reel bases and the reel engagement shafts provided on the reel bases are engaged in the engagement holes of the tape reels 40 and 50, and also tape guides 230, extraction guides 231, pinch rollers 232, and the like are inserted in the mouth portion 21 (see FIG. 26). A light emission portion of a sensor for detecting the initial and terminal points of the magnetic tape 30 is inserted in the shading cylinder 25, and a light receiving portion of the sensor is disposed in proximity to the translucent cutouts 68 (which are overlapped to the translucent holes 25c of the cassette shell 20) of the front lid 60. The light emitting portion and the light receiving portion of the sensor are thus opposed to each other with the magnetic tape put therebetween (see FIG. 23).

Figure 27:
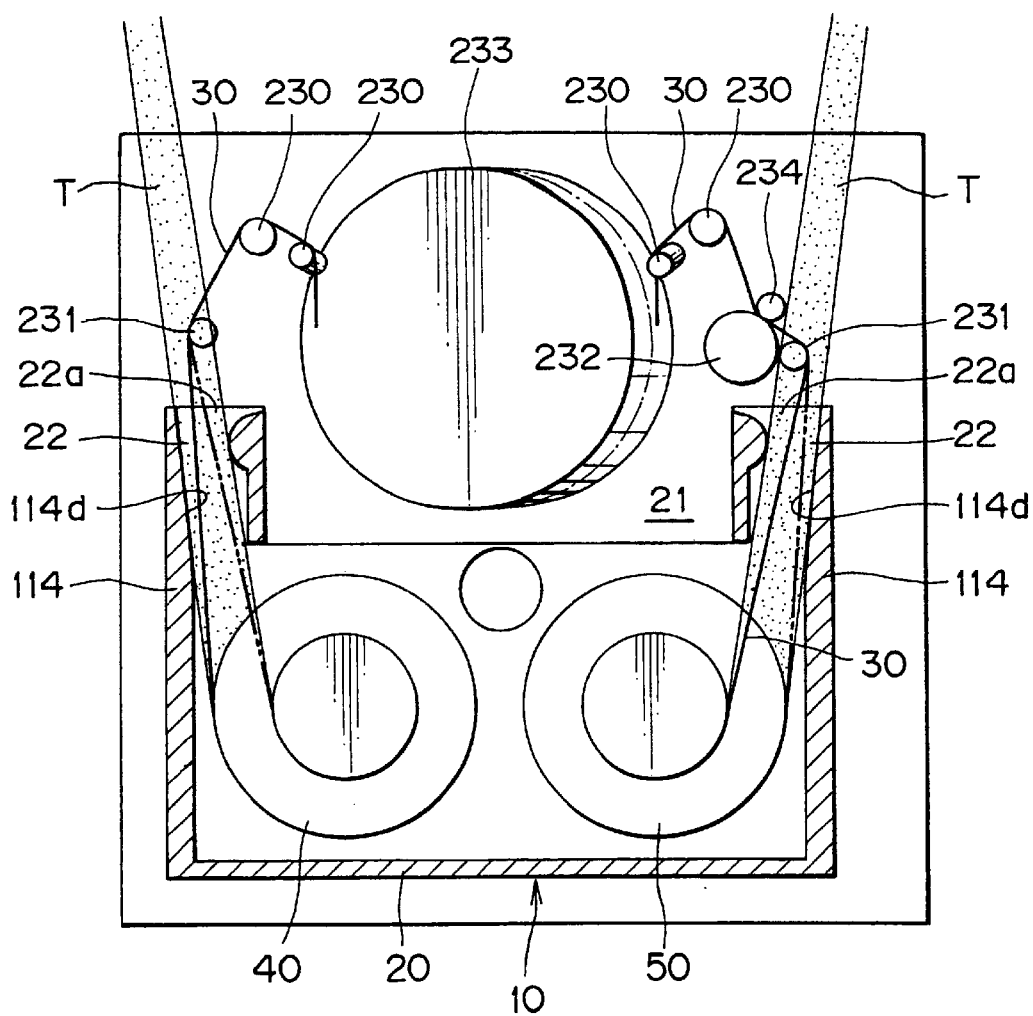
FIG. 27 is a schematic plan view showing a state in which the tape cassette is mounted in the tape drive apparatus and the tape is loaded therein.
Figure 28:
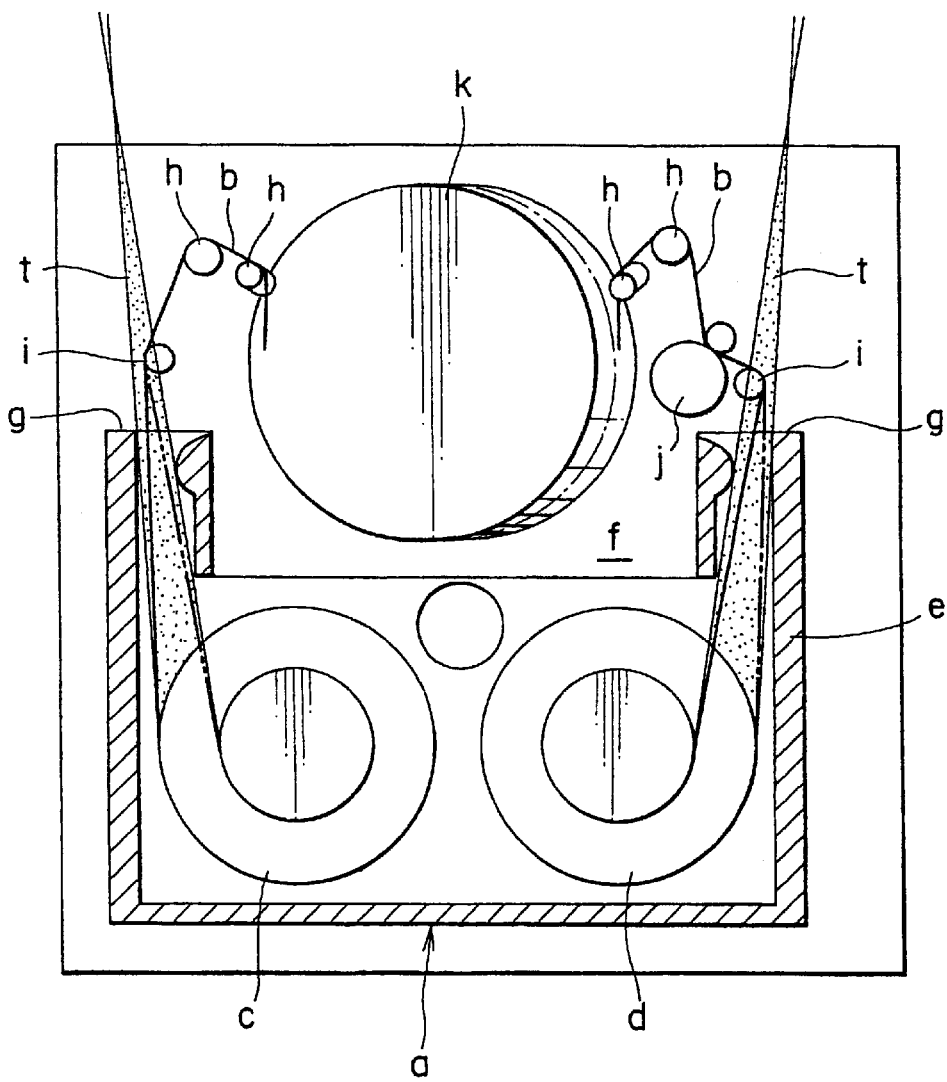
FIG. 28 is a schematic plan view showing a state in which a related art tape cassette is mounted in the tape drive apparatus and the tape is loaded therein.

Then, the tape guides 230, tape extraction guides 231, the pinch rollers 232, and the like are moved, to extract the magnetic tape 30 from the cassette shell 20, and also a rotary head drum 233 relatively enters the mouth portion 21, around which the magnetic tape 30 is wound with a specific winding angle, to form a specific tape path (see FIG. 27). After the formation of the tape path, the pinch rollers 232 are brought into contact with a capstan 234 via the magnetic tape 30.

In this case, since the inner surfaces of the side surface front portions 114, which form the extraction openings 22a of the tape extraction portions 22, are taken as the taper surfaces 114d, the lateral widths of the extraction openings 22a can be made larger than those in the related art tape cassette. Accordingly, in this tape path formed in the tape cassette 10, as compared with the tape path formed in the related art tape cassette, the magnetic tape 30 can be extracted from the cassette shell 20 in such a manner as to be wider outwardly. As a result, a possible arrangement region T (shown by a dotted pattern in the figure) of each of the extraction guides 231 of the tape drive apparatus can be enlarged (see FIG. 27). The thickness of the taper surface portion 114d is preferably set to be in a range of about one-third to one-fourth the thickness of the side surface front portion 114.

In this way, according to this tape cassette 10, as compared with the related art tape cassette, the lateral widths of the openings of the tape extraction portions 22 can be made larger and thereby the possible arrangement regions T of the tape extraction guides 231 of the tape drive apparatus can be made larger, with a result that it is possible to increase the degree of freedom in design of the tape extraction guides 231, and to loosen the arrangement accuracy of the tape extraction guides 231, and further, since the arrangement positions of the tape extraction guides 231 can be disposed outwardly more than those of tape extraction guides provided in the related art tape drive apparatus, it is possible to make the ratio of the size of the rotary head drum 233 to the size of the tape cassette 10 larger than that adopted in the related art tape drive apparatus (see FIG. 27).

Figure 21:
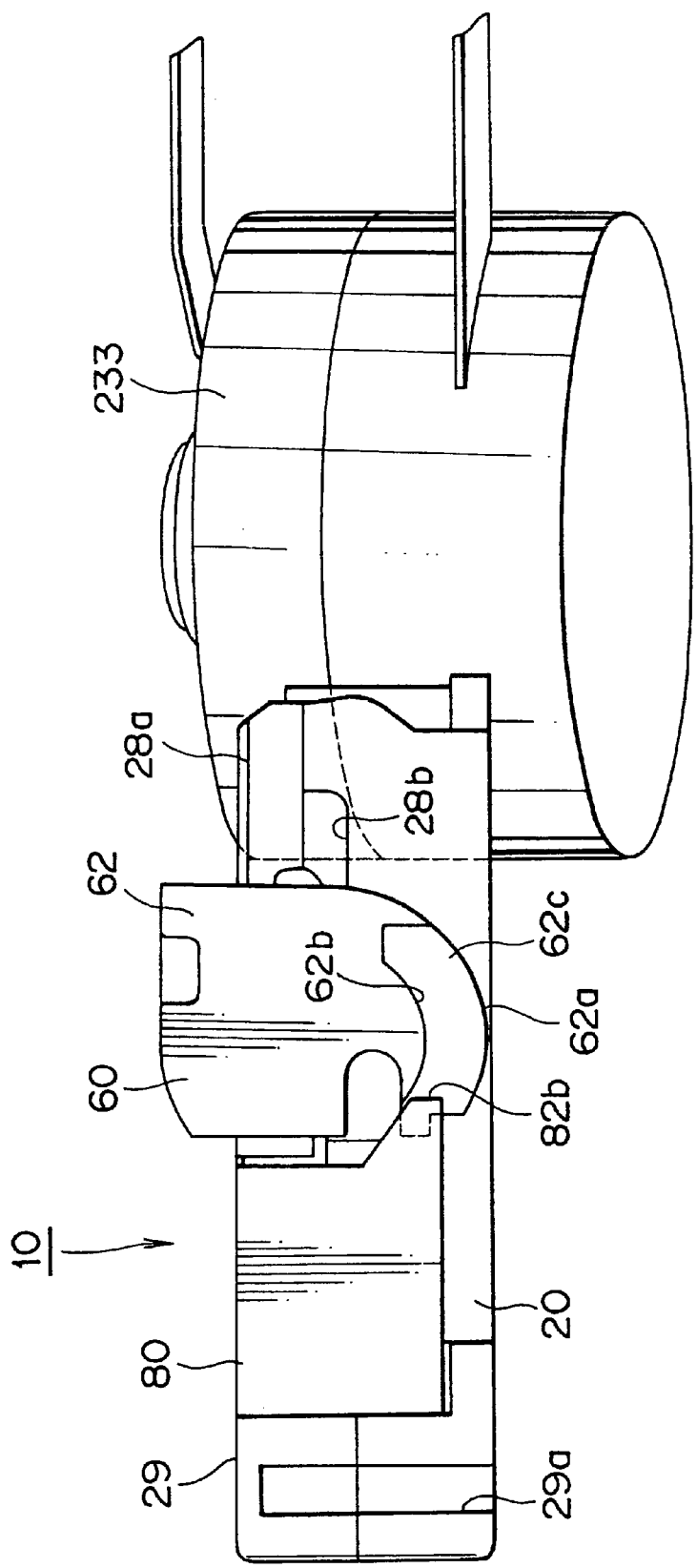
FIG. 21 is a schematic side view showing a state in which the tape cassette is mounted at a specific mounting position of a tape drive apparatus.
Figure 22:
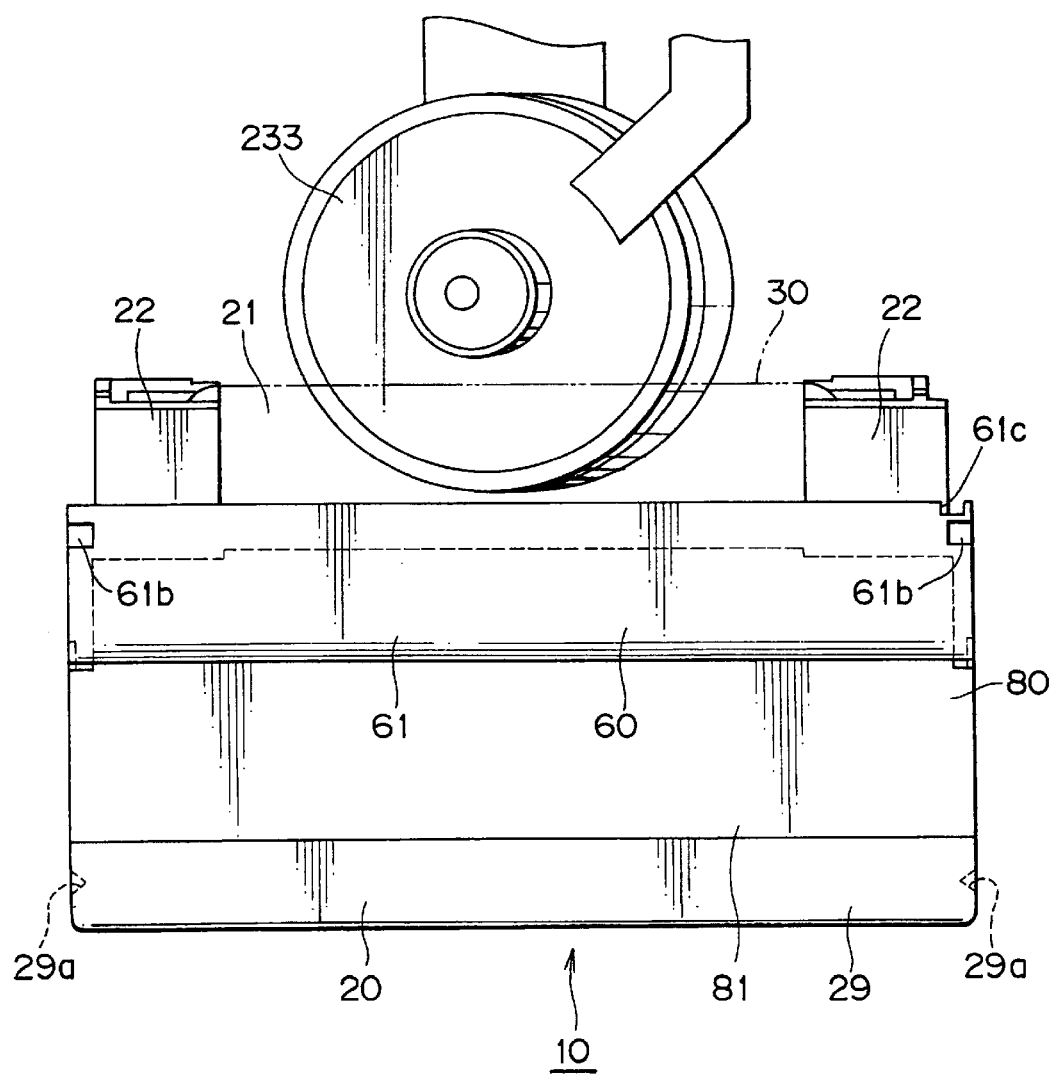
FIG. 22 is a schematic plan view showing the state in which the tape cassette is mounted at the specific mounting position of the tape drive apparatus.

In this tape cassette 10, the upper side of the mouth portion 21 is opened, unlike a tape cassette of a type in which a front lid is simply turned upwardly to be opened or a tape cassette of a type in which a back lid is contained on the upper side of a mouth portion at the time of opening a front lid. Accordingly, in this tape cassette 10, the rotary head drum 233 can be positioned in such a manner as to project from the upper surface of the mouth portion 21 (see FIG. 21), with a result that it is possible to enlarge the azimush angle of each recording track by enlarging the tilt angle of the rotary head drum 233, and hence to increase the recording density with less crosstalk between the recording tracks.

After the recording or reproducing information on or from the magnetic tape 30 is ended, the members such as the tape guides 230, the tape extraction guides 231, and the pinch rollers 232 are moved in the mouth portion 21, and the extra portion of the magnetic tape 30 is wound around the tape reel 40.

Figure 24:
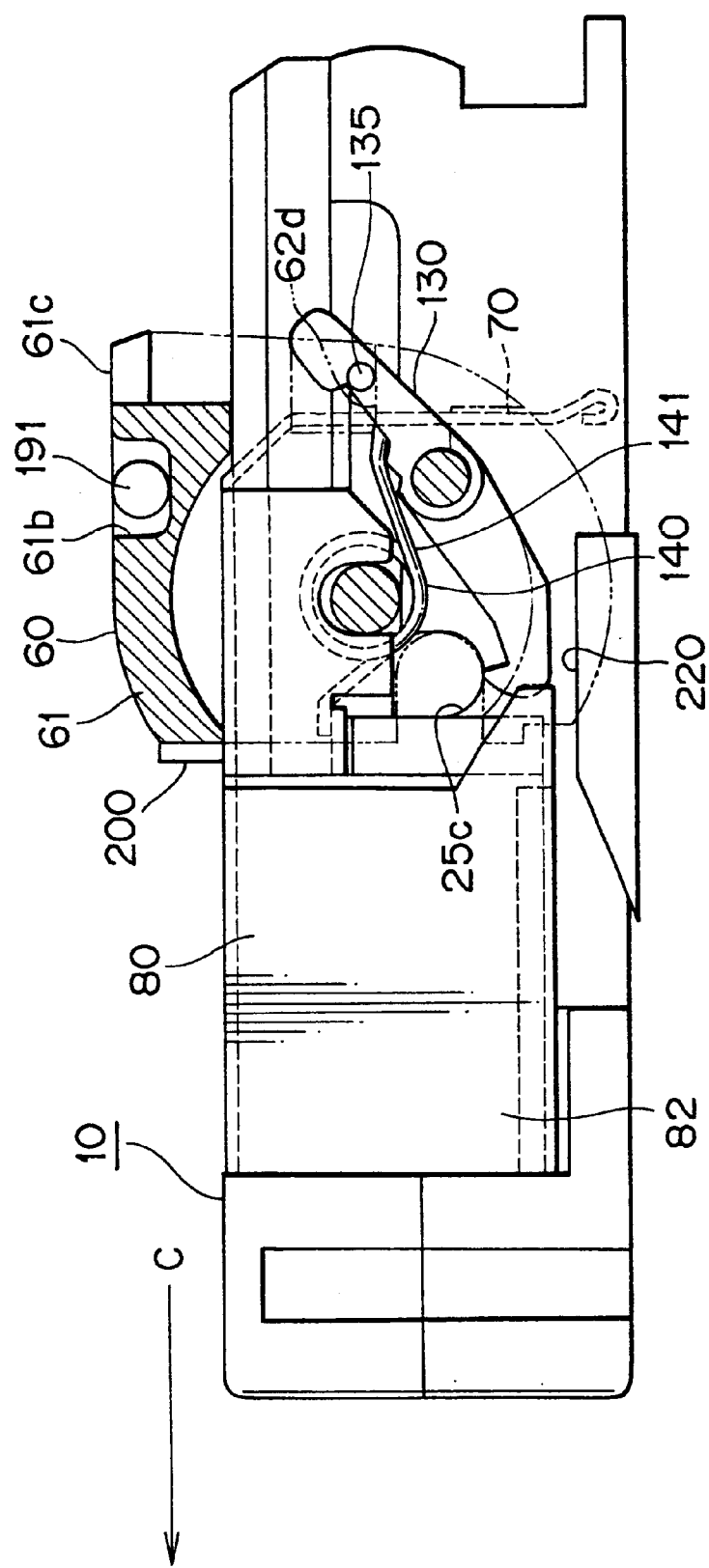
FIG. 24 is a schematic side view showing a state in which lid pressing projections are started to press the front lid, with an essential portion cutaway.

After that, the cassette holder is returned to the above-described insertion ended position, and then the tape cassette 10 is moved in the extraction direction, that is, in the direction C (see FIG. 24).

When the tape cassette 10 is moved in the direction C, the lid pressing projections 200 provided on the supporting members 180r and 180l relatively press both sides of the upper end portions of the front surface portion 61 of the front lid 60 in the direction opposed to the direction C, whereby the front lid 60 and the slider 80 together with the back lid 70) are moved toward the front end of the cassette shell 20.

Figure 25:
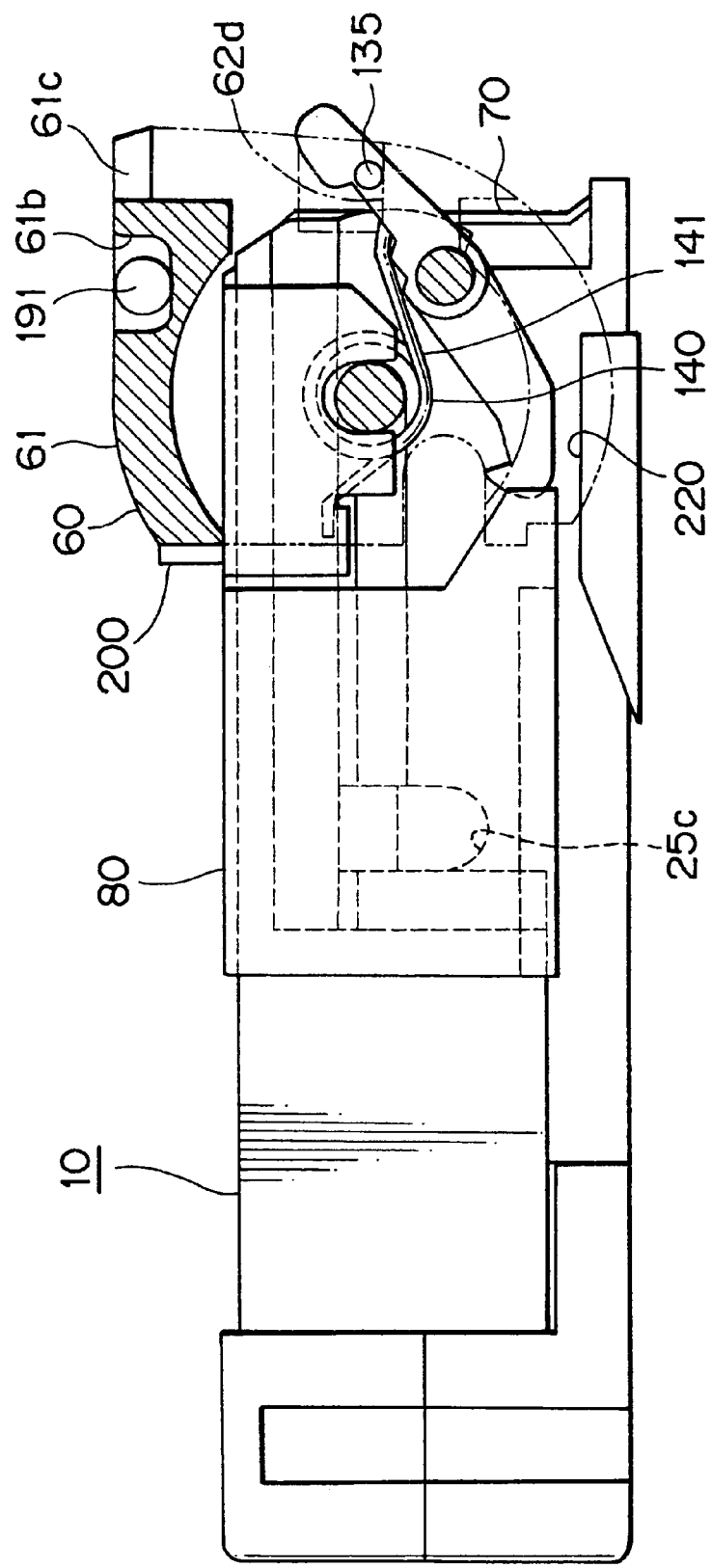
FIG. 25 is a schematic side view showing a state in which the slider reaches the front end of a movement range thereof, with an essential portion cutaway.

When the slider 80 reaches the front end of the movement range (see FIG. 25), the lower end portions 63a of the thick wall portions 63 of the front lid 60 are removed from the upper surface of the cassette shell 20, so that the front lid 60 is turnable downwardly. As a result, the front lid 60 is turned downwardly by the biasing force of the torsion-coil spring 140 applied thereto via the lid lock member 130, to reach the lid closed position, thereby covering the magnetic tape 30 in cooperation with the back lid 70 which has been moved forwardly. Subsequently, the locking claw 132 of the lid lock member 130 is engaged with the upper surface of the sliding projection 83b of the slider 80, to form the locking state of the front lid 60, and then the tape cassette 10 is extracted from the cassette holder (not shown).

In the case of using an auto-changer for the tape cassette, the projection 29 formed on the rear end portion of the cassette shell 20, which projects sideways from the side surfaces of the slider 80, functions as a grip by the changer.

In this tape cassette 10, since the lid supporting portions 83 of the slider 80 are retreated inwardly from the principal surface portions 82, the outer surfaces of the side surface portions 62 of the front lid 60 supported by the lid supporting portions 83 are positioned substantially at the same levels as those at which the outer surfaces of the principal surface portions 82 of the slider 80 are positioned. As a result, only the slight step 170 is formed between the projection 29 and an approximately rear half of each side surface of the cassette shell 20 (that is, a surface, excluding the rear end portion, of each of the side surface rear portions 103 of the upper shell 100) which is in contact with each of the principal surfaces 82 of the slider 80 (see FIGS. 1 and 2). The step 170 is equivalent to the thickness of each of the principal surface portions 82 of the slider 80. In this way, since the steps 170 are very small, they are not caught by an entrance or the like of the cassette holder.

Further, since the overlap portions 82b of the slider 80 are positioned outside the overlap portions 62c of the side surface portions 62 of the front lid 60, the overlap portions 62c, which are the rear end portions of the side surface portions 62, are supported by the overlap portions 82b of the slider 80 during turning of the front lid 60. As a result, the front lid 60 can be stably, smoothly turned.

Although the above-described embodiment has been described by example of the tape cassette of the type including the slider and the back lid, the present invention is applicable to a conventional tape cassette of a type including neither a slider nor a back lid. That is to say, the present invention is widely applicable to tape cassettes insofar as a tape-like recording medium is extracted from a cassette shell of each of the tape cassettes and is wound around a rotary head drum to form a tape path.

In the above-described embodiment, the taper surfaces of the outer side surface front portions of the cassette shell are formed on the lower shell side. This is because the side surface front portions constituting the tape extraction portions are provided on the lower shell side. Accordingly, if the side surface front portions constituting the tape extraction portions are provided on the upper shell side, the taper surfaces may be formed on the upper shell side, and further, if the side surface portions constituting the tape extraction portions are provided on both the upper shell and lower shells sides, the tape surfaces may be formed on both the upper shell and lower shell sides.

While the preferred embodiment of the present invention has been described by using specific terms, such description is for illustrative purposes only, and it is to be understood that changes and variations may be made without departing from the spirit or scope of the following claims.

What is claimed is:

1. A tape cassette comprising:

a cassette shell in which tape reels, around which a tape-like recording medium is wound, are contained;

a mouth portion provided in a front portion of said cassette shell in such a manner as to be opened forwardly, upwardly, and downwardly, said mouth portion being positioned such that part of said tape-like recording medium crosses a front end of said mouth portion; and a front lid, provided on said cassette shell, for covering a front side of said tape-like recording medium;

wherein both side portions of said mouth portion of said cassette shell are taken as tape extraction portions opened forwardly; and each of the inner surfaces of outer side surface front portions of said cassette shell, which forms each of the inner surfaces of outer side walls of said tape extraction portions, is formed into a tape extraction opening which becomes wider outwardly as nearing a cassette front end.

2. A tape cassette according to claim 1, wherein at a time of extraction of said tape-like recording medium, said tape-like recording medium passes through regions, each of which is formed between an extraction line connecting an extracted portion of said recording medium wound around said tape reels at a minimum amount to a tip of an inner side wall of each said tape extraction portion and an extension line connecting an extracted portion of said recording medium wound around said tape reels at a maximum amount to a tip of a taper portion formed on the outer side wall of each said tape extraction portion.

3. A tape cassette according to claim 2, wherein a thickness of the tip of said taper portion is set to be about half a wall thickness of said cassette shell.

* * * * *